United States Patent
Nakamura et al.

(10) Patent No.: US 9,165,395 B2
(45) Date of Patent: Oct. 20, 2015

(54) IMAGE PROCESSING APPARATUS AND METHOD

(75) Inventors: Sensaburo Nakamura, Shizuoka (JP); Norimasa Ozaki, Kanagawa (JP); Takeo Ugai, Kanagawa (JP); Toshimasa Kakihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 12/831,704

(22) Filed: Jul. 7, 2010

(65) Prior Publication Data

US 2011/0012913 A1     Jan. 20, 2011

(30) Foreign Application Priority Data

Jul. 14, 2009  (JP) ................. P2009-166169

(51) Int. Cl.
*G09G 5/00* (2006.01)
*G06T 15/04* (2011.01)
*G06T 11/00* (2006.01)

(52) U.S. Cl.
CPC .............. *G06T 15/04* (2013.01); *G06T 11/001* (2013.01); *G06T 2200/08* (2013.01); *G06T 2215/16* (2013.01)

(58) Field of Classification Search
CPC ....... G06T 15/04; G06T 19/00; G06T 11/001; G06T 13/00; G06T 15/10; G06T 15/503; G06T 7/0071; G06T 15/005; G06T 11/40
USPC .................. 345/582, 428, 581, 589, 594, 619
See application file for complete search history.

(56) References Cited

U.S. PATENT DOCUMENTS

| | | | | | |
|---|---|---|---|---|---|
| 5,255,352 | A | * | 10/1993 | Falk ............................... | 345/582 |
| 5,446,833 | A | * | 8/1995 | Miller et al. .................. | 345/585 |
| 5,469,535 | A | * | 11/1995 | Jarvis et al. .................... | 345/582 |
| 5,710,878 | A | * | 1/1998 | McCoy et al. ................ | 345/419 |
| 5,742,294 | A | | 4/1998 | Watanabe et al. | |
| 5,903,270 | A | * | 5/1999 | Gentry et al. ................. | 345/419 |
| 2002/0154133 | A1 | * | 10/2002 | Dery ............................. | 345/582 |
| 2003/0222875 | A1 | * | 12/2003 | Kawakami et al. ........... | 345/473 |
| 2004/0246250 | A1 | * | 12/2004 | Kaku et al. .................... | 345/419 |
| 2006/0087505 | A1 | * | 4/2006 | Dumesny et al. ............. | 345/419 |
| 2006/0244757 | A1 | * | 11/2006 | Fang et al. .................... | 345/582 |
| 2008/0049011 | A1 | * | 2/2008 | Fozzard ........................ | 345/419 |
| 2009/0160856 | A1 | * | 6/2009 | Hoguet ......................... | 345/420 |
| 2009/0251478 | A1 | * | 10/2009 | Maillot et al. ................ | 345/581 |
| 2010/0111370 | A1 | * | 5/2010 | Black et al. ................... | 382/111 |

FOREIGN PATENT DOCUMENTS

| | | |
|---|---|---|
| JP | 2000 152079 | 5/2000 |
| JP | 2001 14489 | 1/2001 |
| JP | 2002 369076 | 12/2002 |

* cited by examiner

*Primary Examiner* — Ke Xiao
*Assistant Examiner* — Kim-Thanh T Tran
(74) *Attorney, Agent, or Firm* — Sony Corporation

(57) ABSTRACT

Provided is an image processing apparatus including: an image selection unit selectively extracting one image data from a plurality of input image data; an image generation unit generating a computer graphics image based on computer graphics description data; a surface designation unit designating a surface of a predetermined polygon using surfaces of polygons among the computer graphics description data as a selection; and an image mapping unit texture-mapping an image according to the image data extracted by the image selection unit onto the surface of the polygon designated by the surface designation unit.

20 Claims, 22 Drawing Sheets

FIG. 2

KIND EXAMPLE: phong

| PARAMETER | VALUE | MEANING |
|---|---|---|
| <emission> | COLOR | QUANTITY OF LIGHT EMITTED FROM LIGHT SOURCE |
| <ambient> | COLOR | QUANTITY OF AMBIENT LIGHT BEING EMITTED |
| <diffuse> | COLOR | QUANTITY OF DIFFUSED LIGHT BEING REFLECTED |
| <specular> | COLOR | QUANTITY OF LIGHT REFLECTED FROM MIRROR SURFACE |
| <shininess> | NUMERICAL VALUE | REFLECTIVE PROJECTION OF MIRROR SURFACE |
| <reflective> | COLOR | TOTAL MIRROR SURFACE REFLECTION |
| <reflectivity> | NUMERICAL VALUE | ADDITIONAL QUANTITY OF LIGHT OF TOTAL MIRROR SURFACE REFLECTION |
| <transparent> | COLOR | COLOR OF TOTALLY REFRACTED LIGHT |
| <transparency> | NUMERICAL VALUE | ADDITIONAL QUANTITY OF LIGHT OF TOTAL REFRACTION |

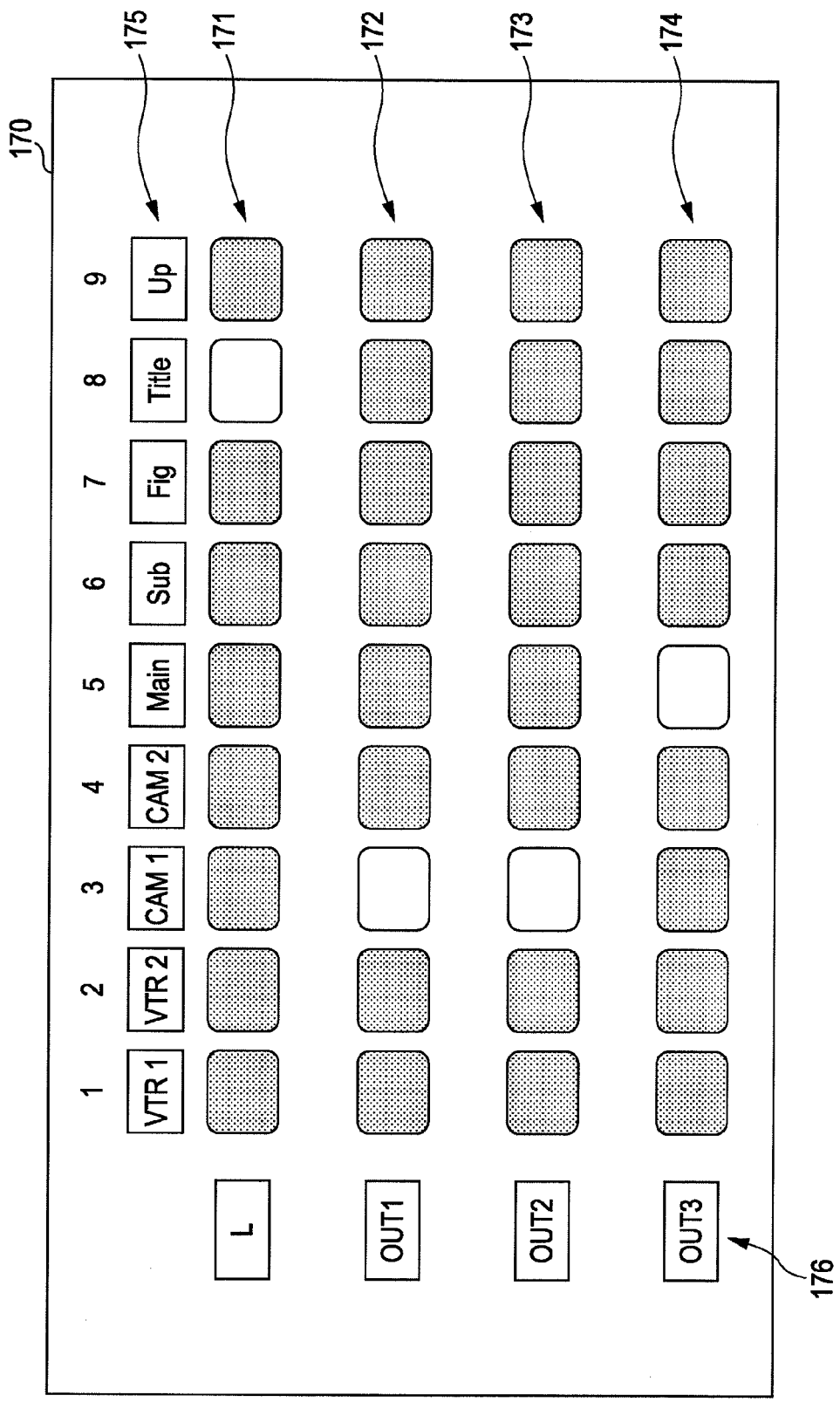

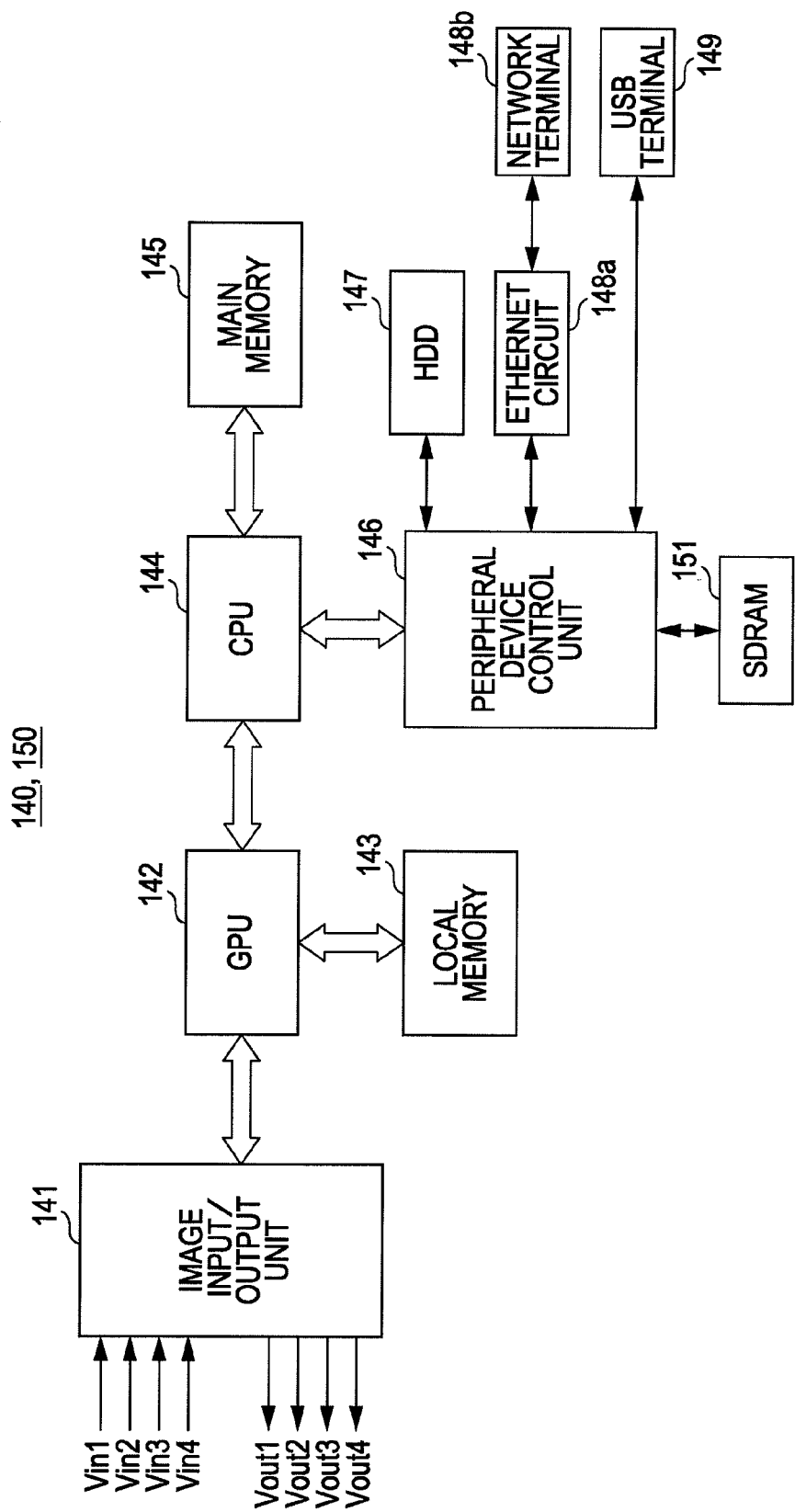

(0, 1) (1, 1)
(0, 0) (1, 0)

(0, 1)
(0, 0) (1, 0) (2, 0)

○ ATTRIBUTE = K
◉ ATTRIBUTE = L
○ ATTRIBUTE = M

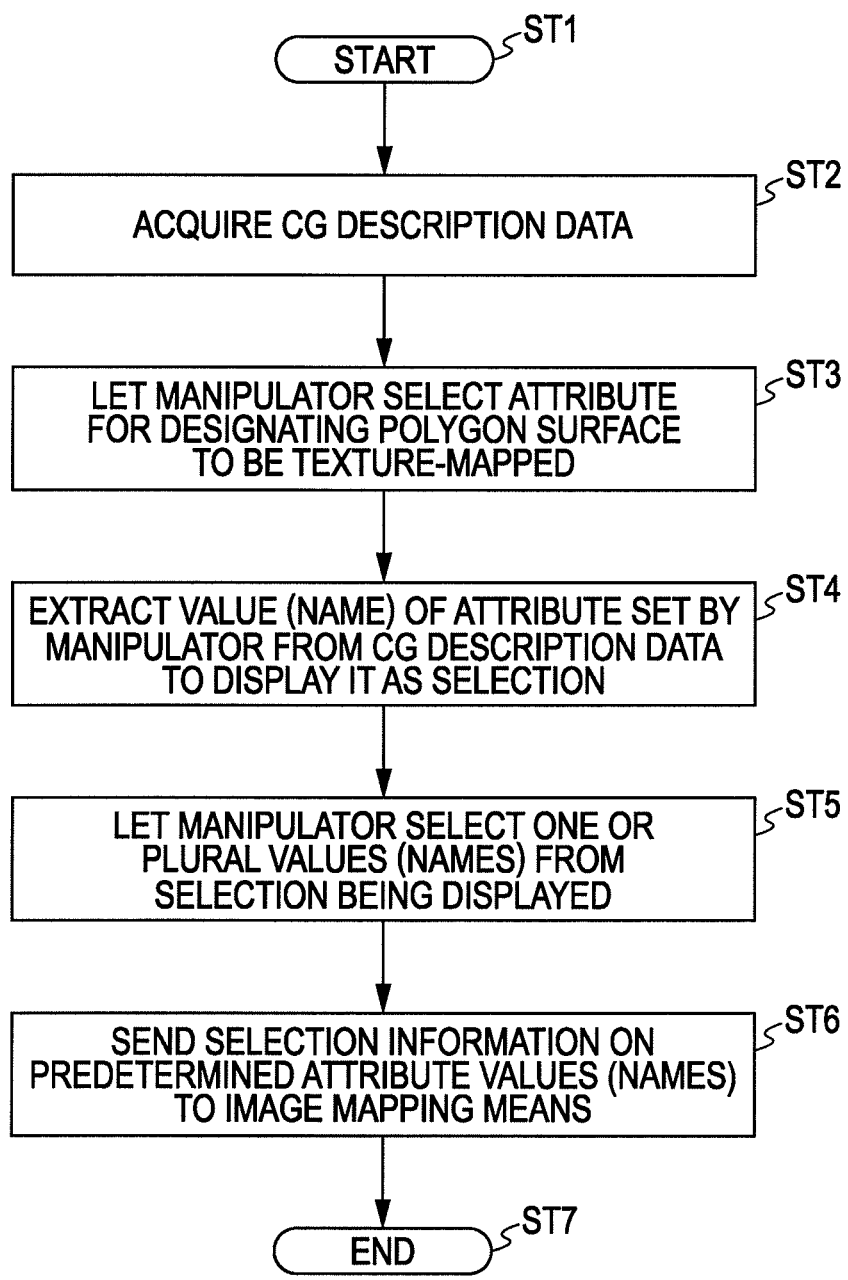

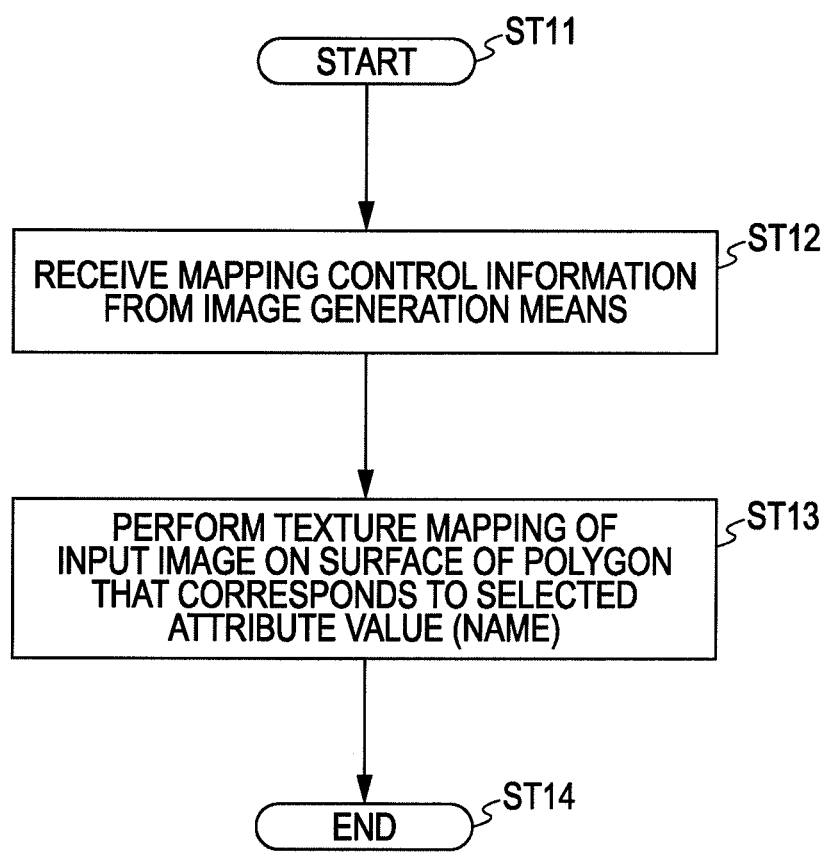

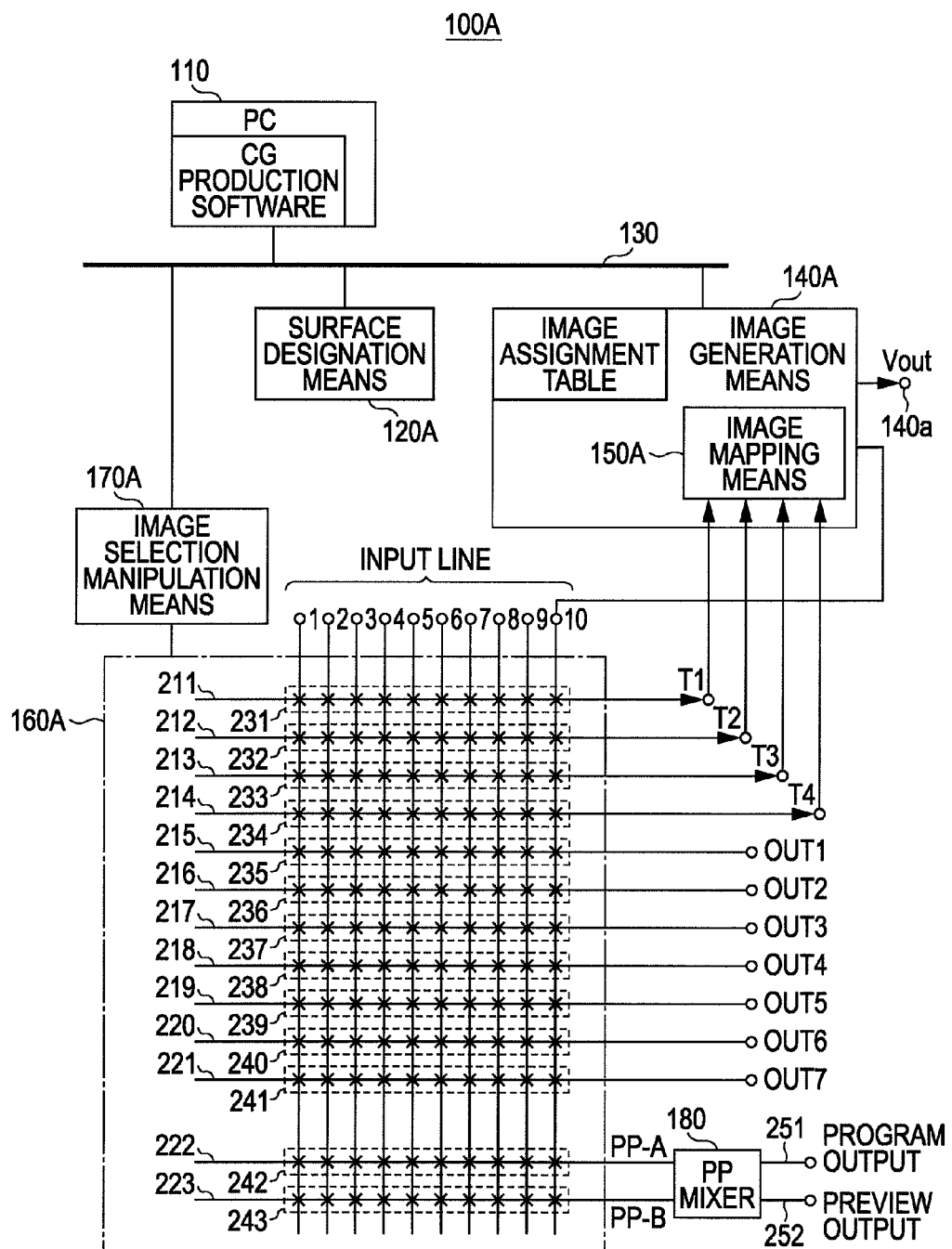

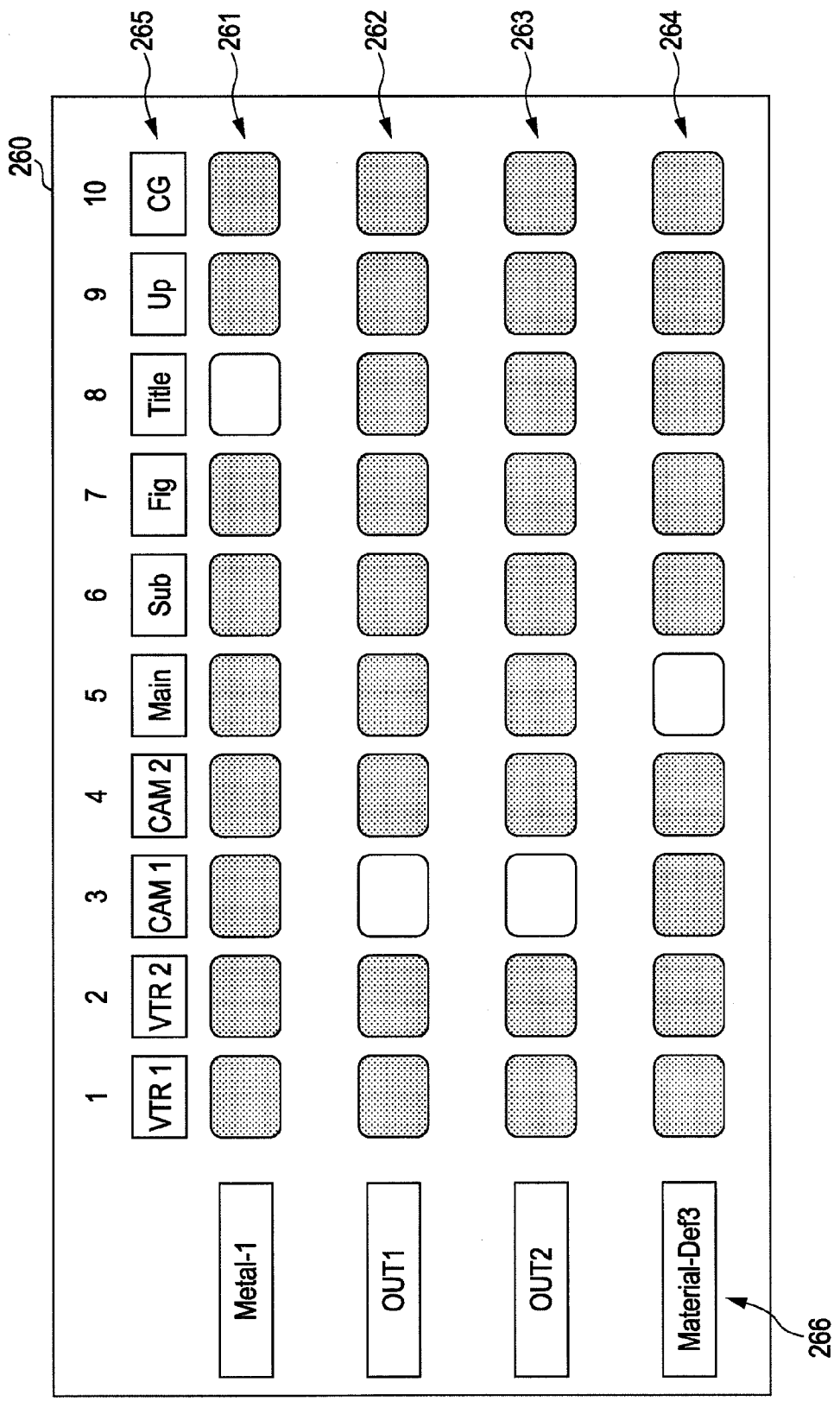

FIG. 12A

| | ASSIGNMENT OF OUTPUT BUS LINE | |
|---|---|---|
| 1 | Metal-1 | Select |
| 2 | OUT1 | Select |
| 3 | OUT2 | Select |
| 4 | Material-Def3 | Select |

FIG. 12B

SELECTION OF OUTPUT BUS LINE

- ○ OUT1
- ○ OUT2
- ○ OUT3
- ○ OUT4
- ○ OUT5
- ○ OUT6
- ○ OUT7

- ○ PP-A
- ○ PP-B
- ● Metal-1
- ○ Metal-2
- ○ Material-Def1
- ○ Material-Def2
- ○ Material-Def3

[ OK ]    [ CANCEL ]

FIG. 13

| BUS NUMBER | MAPPING INPUT |
|---|---|
| 1 | T1 |
| 2 | T2 |
| 3 | T3 |
| 4 | T4 |
| 5 | NA |
| 6 | NA |
| ⋮ | ⋮ |

FIG. 14A

| MAPPING INPUT | ATTRIBUTE VALUE (NAME) |
|---|---|
| T1 | Metal-1 |
| T2 | Material-Def3 |
| T3 | NA (NON) |
| T4 | NA (NON) |

FIG. 14B

| MAPPING INPUT | ATTRIBUTE VALUE (NAME) |
|---|---|
| T1 | Metal-1   Material-Def2 |
| T2 | Material-Def3 |
| T3 | NA (NON) |
| T4 | NA (NON) |

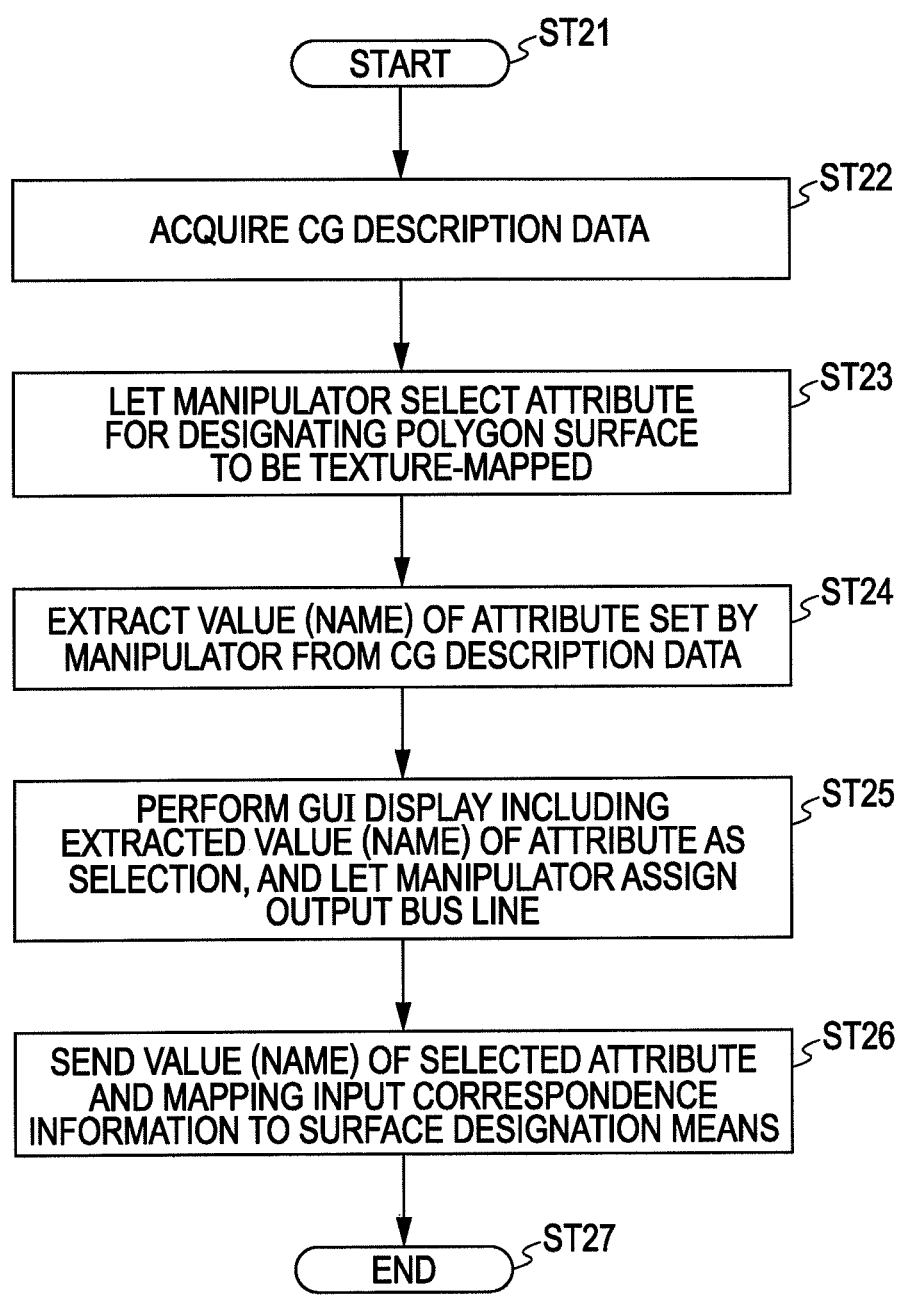

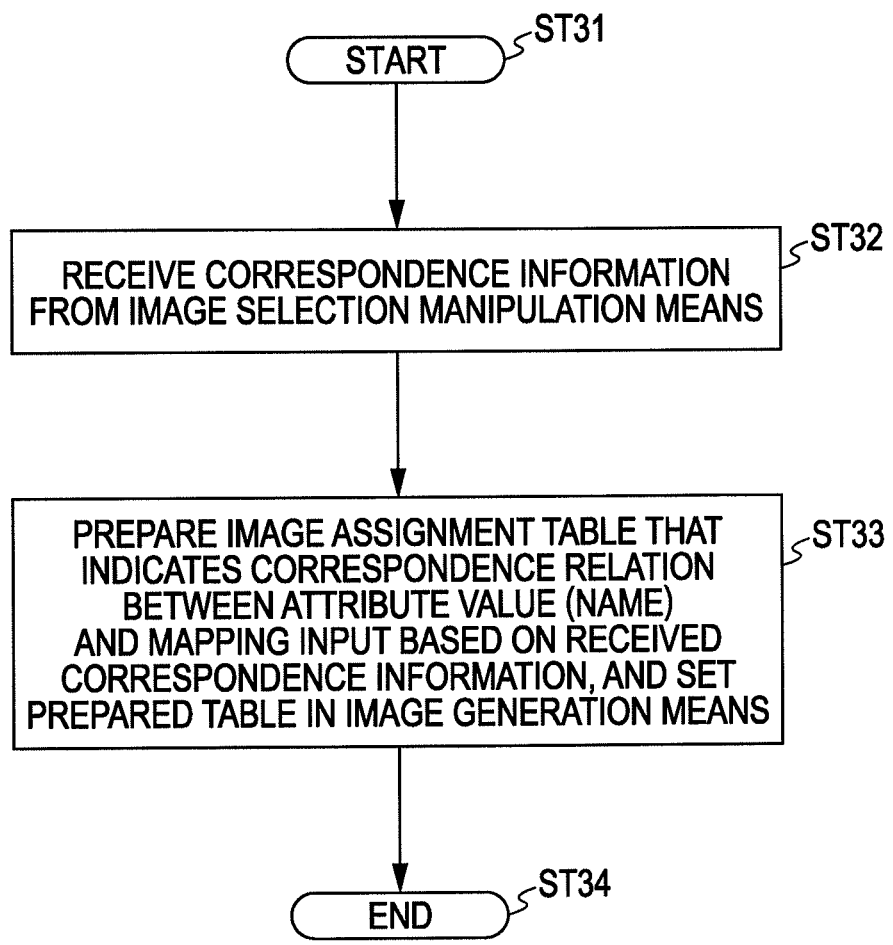

FIG. 21

| | | |
|---|---|---|
| | ASSIGNMENT OF DESIGNATED BUTTON LINE | |
| 1 | OUT1 | Select |
| 2 | OUT2 | Select |
| 3 | OUT3 | Select |
| 4 | OUT4 | Select |
| 5 | OUT5 | Select |
| 6 | PP-A | Select |
| 7 | PP-B | Select |
| 8 | Metal-1 | Select |
| 9 | Material-Def3 | Select |

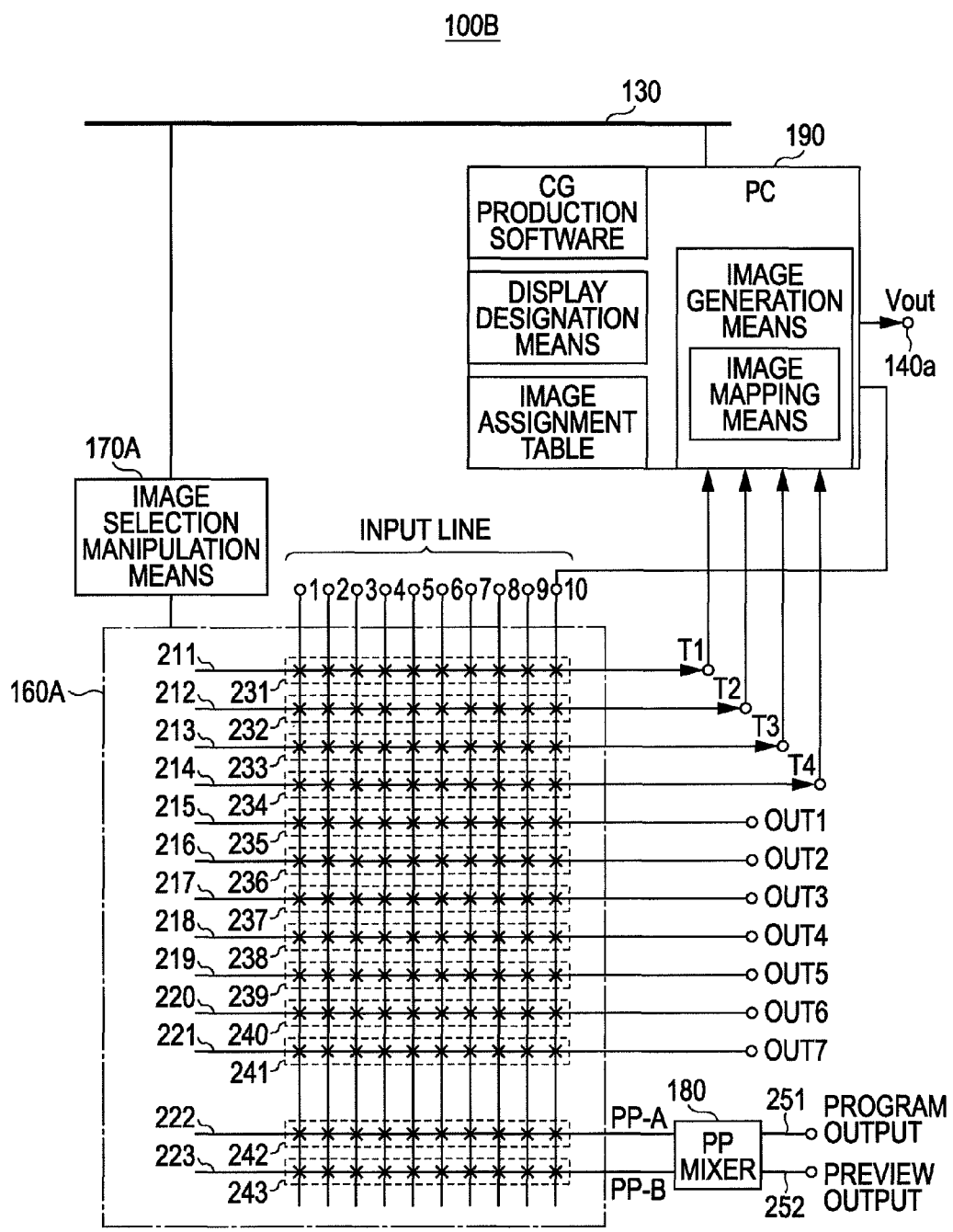

IMAGE PROCESSING APPARATUS AND METHOD

RELATED APPLICATION

The present application contains subject matter related to that disclosed in Japanese Priority Patent Application JP 2009-166169 filed in the Japan Patent Office on Jul. 14, 2009, the entire content of which is hereby incorporated by reference.

BACKGROUND OF THE INVENTION

1. Field of the Invention

The present invention relates to an image processing apparatus and method. In particular, the present invention relates to an image processing apparatus and so on, which performs image synthesis by texture-mapping an image according to image data onto a computer graphics image.

2. Description of the Related Art

In a three-dimensional graphics system, drawing of a whole image is performed by decomposing three-dimensional coordinates into polygons such as triangles or the like and drawing the polygons. Accordingly, in this case, the three-dimensional image may be defined as a combination of polygons. However, surfaces of surrounding objects may have repeated patterns of complicated shapes in many cases, and as the shape or pattern of an object becomes complicated and elaborated, it becomes difficult to perform modeling of the corresponding shape or pattern into triangles or the like. As a means for solving this, texture mapping has been used.

The texture mapping realizes a high-reality image with a small number of vertexes by attaching image data received from a scanner or the like to the surface of an object, and defines mapping from an object coordinate system onto a texture coordinate system. The texture mapping obtains mapping from a window coordinate system onto a texture coordinate system, and obtains texture cell elements (texels) which are texture elements corresponding to respective picture cell elements (pixels) in the window coordinate system.

Image data that is used for texture is stored in a memory region that is called a texture memory. Accordingly, by performing updating of the texture memory as necessary by using moving image data, texture mapping processing with moving images becomes possible.

For example, in Japanese Unexamined Patent Application Publication No. 2002-369076, a three-dimensional special effects device is described, which transits a certain texture mapped image of three-dimensional computer graphics (CG) to another image with the lapse of time through the control of texture coordinates.

Also, for example, in Japanese Unexamined Patent Application Publication No. 2000-152079, a method of generating a series of images is described, as technology of synthesizing computer graphics and real images, which designates a region or correspondence between a playback start time of an image to be texture-mapped and a frame, and realizes desired frame attachment on a time axis.

Also, for example, in Japanese Unexamined Patent Application Publication No. 2001-014489, a drawing apparatus is described, which realizes seamless shift control of a texture mapping state of a moving image of 3D CG and the display of a moving image only.

SUMMARY OF THE INVENTION

Recently, an animation operation has been performed with respect to a prepared computer graphics image by the existing state of things, or a generated computer graphics image has been changed by changing parameters of a portion of the image. This technology can be used for live broadcasting rather than preserving and using an image that is generated in advance as a result of synthesis. Even with respect to a texture-mapped image among the computer graphics images, it becomes necessary to be able to select the texture-mapped image by the existing state of things.

In the related art, since it is normal to synthesize images with putting hours in it before the images are provided for broadcasting and so on, it does not follow the above-described desires. For example, in the case where the texture mapping of desired images V1 and V2 onto surface of respective objects in certain timing is demanded with respect to computer graphics (CG) in which three objects are drawn and moved on a screen by their animations, it is difficult to perform manipulation for such operation in the related art.

For example, FIGS. 23A to 23D illustrate examples of CG images in which three objects OB1 to OB3 are drawn and moved on a screen by their animations. Also, FIGS. 24A to 24D illustrate examples of texture mapping of desired images V1 and V2 onto surfaces of the three objects OB1 to OB3 in certain timing.

The CG data preparing process is performed by putting hours in it. On the other hand, the contents of the texture-mapped image are unable to be expected in this stage.

In view of the above situation, it is desirable to make it possible to select and synthesize a desired image with a desired surface of a compute graphics image in certain timing.

According to an embodiment of the present invention, there is provided an image processing apparatus, which includes image processing apparatus including: an image selection means for selectively extracting one image data from a plurality of input image data; an image generation means for generating a computer graphics image based on computer graphics description data; a surface designation means for designating a surface of a predetermined polygon using surfaces of polygons among the computer graphics description data as a selection; and an image mapping means for texture-mapping an image according to the image data extracted by the image selection means onto the surface of the predetermined polygon designated by the surface designation means.

In an embodiment of the invention, one image data is selectively extracted from the plurality of input image data by the image selection means. Also, by the image generation means, the computer graphics image is generated based on the computer graphics description data. In this case, the drawing of the whole image is performed by decomposing three-dimensional coordinates into polygons such as triangles or the like and drawing the polygons.

Also, the surfaces of polygons among the computer graphics description data are determined as the selection, and the surface of the predetermined polygon is designated. For example, the surface of the predetermined polygon is designated by selecting a value (name) of a predetermined attribute among the computer graphics description data. Here, the predetermined attribute may be, for example, a node (object), material definition, surface information on the material definition, or the like. Among the computer graphics description data, the correspondence between the predetermined attribute value and the surface of the polygon has been defined.

Also, by the image mapping means, the image according to the image data extracted by the image selection means is texture-mapped onto the surface of the predetermined polygon designated by the surface designation means among the surfaces of the polygons drawn by the image generation means. The drawing of the texture mapping is performed by continuously updating the image frame in accordance with a flow of image data (a series of frames) from the image selection means.

As described above, one image data is selectively extracted from the plurality of input image data by the image selection means. Also, the image according to this image data is texture-mapped onto the surface of the predetermined polygon that is designated by the surface designation means. Accordingly, the texture mapped image is changed due to the change of image data that is extracted by the image selection means. Since all of a series of operations processes the input image data within a predetermined delay range, the apparatus according to the present invention can be used for the operation of live broadcasting. That is, the delay until the image input to the apparatus is reflected in the output of the apparatus becomes to be equal to or less than a predetermined number of frames. Accordingly, a manipulator can selectively synthesize a desired image with a desired surface of the computer graphics image in certain timing.

In the embodiment of the present invention, for example, a plurality of image selection means may be provided, and the surface designation means may designate the surface of a predetermined polygon, for each image selection means, using surfaces of polygons among the computer graphics description data as a selection. The image mapping means may perform texture-mapping of an image according to the image data extracted by the corresponding image selection means onto the surface of the predetermined polygon designated for each image selection means by the surface designation means among the surfaces of polygons drawn by the image generation means.

In this case, an image assignment table for making correspondence between an image identifier that identifies image data extracted by the plurality of image selection means and the surface designation is set by the surface designation means, and the texture mapping process is performed based on the image assignment table in the image mapping means. In this case, desired images can be selected and synthesized with the plurality of surfaces of the computer graphics image, respectively, in certain timing.

Also, in the embodiment of the present invention, in the case where a plurality of image selection means is provided, a display means for displaying surface designation information may be further provided corresponding to the image selection means of which the surface designation has been made by the surface designation means. In this case, the image according to the image data extracted by the respective image selection means has been texture-mapped onto the surface of the computer graphics image, and a manipulator can easily recognize which information the surface of the computer graphics image is designated by.

According to the embodiments of the present invention, by selectively extracting one image data from a plurality of input image data and texture-mapping the image according to the extracted image data onto the surface of a predetermined polygon, it becomes possible to select and synthesize a desired image with a desired surface of the computer graphics image in certain timing.

BRIEF DESCRIPTION OF THE DRAWINGS

FIG. 2 is a diagram illustrating an example of surface information on a material;

FIG. 3 is a diagram illustrating an example of an external appearance of an image selection manipulation unit (manipulation table);

FIG. 4 is a block diagram illustrating a detailed configuration example of an image generation unit and an image mapping unit;

FIG. 8 is a flowchart schematically illustrating a processing order of a surface designation unit;

FIG. 9 is a flowchart schematically illustrating a processing order of an image mapping unit;

FIG. 10 is a block diagram illustrating a configuration example of an image processing apparatus according to a second embodiment of the invention;

FIG. 11 is a diagram illustrating an external appearance of an example of a manipulation table;

FIGS. 12A and 12B are diagrams illustrating an example of GUI display that is displayed during assignment of output bus lines and an example of GUI display that is displayed during selection of an output bust line;

FIG. 13 is a diagram illustrating an example of a mapping input correspondence table that indicates the correspondence between bus numbers of output bus lines and mapping inputs T1 to T4;

FIGS. 14A and 14B are diagrams illustrating an example of an image assignment table that indicates the correspondence relationship between mapping inputs T1 to T4 and attribute values (names);

FIG. 15 is a flowchart schematically illustrating processing order of an image selection manipulation unit;

FIG. 16 is a flowchart schematically illustrating a processing order of a surface designation unit;

FIG. 21 is a diagram illustrating an example of GUI display that is displayed when a press button line (designation button line) is assigned;

FIG. 22 is a block diagram illustrating a modification of an image processing apparatus;

DESCRIPTION OF THE PREFERRED EMBODIMENTS

Hereinafter, best modes (hereinafter referred to as "embodiments") for carrying out the invention will be described. In this case, the explanation will be made in the following order.

1. First embodiment
2. Second embodiment
3. Modifications

<1. First Embodiment>

[Configuration of an Image Processing Apparatus]

Figure 1:
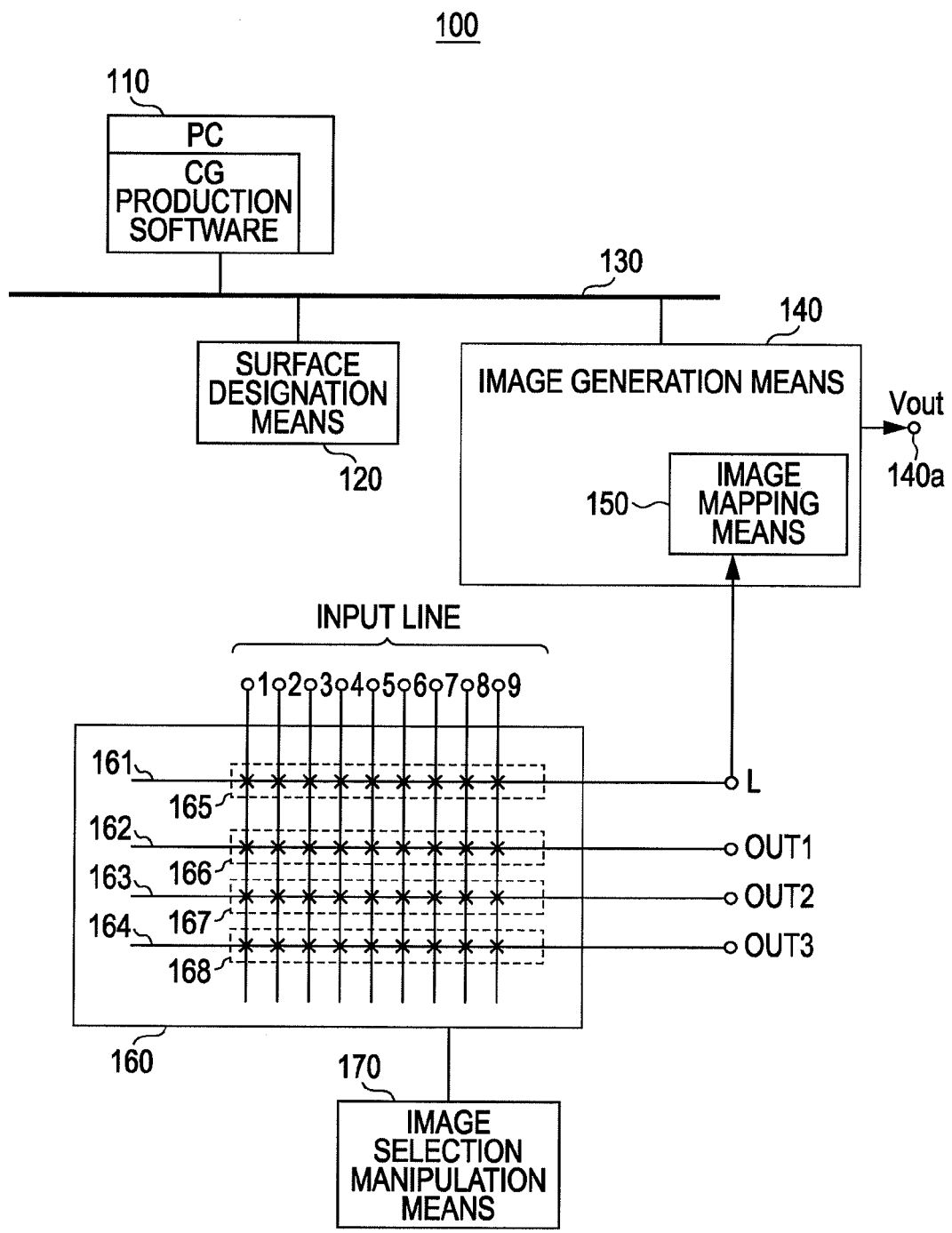
FIG. 1 is a block diagram illustrating a configuration example of an image processing apparatus according to a first embodiment of the invention.

The first embodiment of the present invention will be described. FIG. 1 illustrates a configuration example of an image processing apparatus 100 according to the first embodiment. The image processing apparatus 100 includes a CG (Computer Graphics) production unit 110, a surface designation unit 120, a network 130, an image generation unit 140, and an image mapping unit 150. Also, the image processing apparatus 100 includes a matrix switch 160 and an image selection manipulation unit 170. The CG production unit 110, the surface designation unit 120, and the image generation unit 140 are connected to the network 130, respectively.

The CG production unit 110 is configured by a PC (Personal Computer) having CG production software. The CG production unit 110 outputs CG description data of a predetermined format. As a format of CG description data, for example, there is Collada (registered trademark). Collada is a definition of technology for realizing the switching of a three-dimensional (3D) CG data on XML (Extensible Markup Language). The CG description data describes, for example, the following information.

(a) Definition of a Material

The definition of the material is the quality (vision) of the surface of a CG object. In the definition of the material, information on color, reflection type, light emission, concavo-convex state, and the like, is included. Also, information on texture mapping may be included in the definition of the material. As described above, the texture mapping is a method of attaching an image to a CG object, and can express a complicated shape or the like while lightening the load of a processing system. FIG. 2 illustrates an example of surface information on the material. In this case, the texture mapping may be designated instead of colors.

(b) Definition of Geometric Information (Geometry)

In the definition of geometric information (geometry), information on positional coordinates of polygon mesh, coordinates of vertexes, and the like, is included.

(c) Definition of a Camera

In the definition of a camera, parameters of a camera are included.

(d) Definition of Animation

In the definition of animation, information on diverse values in each key frame of animation is included. Also, in the definition of animation, time information in each key frame of animation is included. Diverse information are information on, for example, time for key frame points of corresponding objects (nodes), coordinate values of positions or vertexes, sizes, tangent vectors, interpolation method, changes of animation of various kinds of information, and the like.

(e) Definition of Geometric Information Corresponding to a Position, Direction, and Size of a Node (Object) of a Scene, and Definition of a Corresponding Material Such information are not separately scattered, but, for example, correspond as follows.

node . . . geometric information
node . . . materials (plural)
geometric information . . . a set of polygons (plural)
a set of polygons . . . material (one of materials that correspond to a node)
animation . . . node A technology that configures one picture is called a scene. Each definition is called a library, and is referred to in the scene. For example, in the case where two rectangular parallelepiped objects exist, each object is described as one node, and each node is coupled with any one of material definitions. As a result, the respective rectangular parallelepiped objects are coupled with the material definitions, and are drawn as colors or reflection characteristics according to the respective material definitions.

Also, in the case where the rectangular parallelepiped object is described as a plurality of polygon sets and the material definitions are coupled to the polygon sets, the polygon sets are drawn with different material definitions. For example, the object of the rectangular parallelepiped that has six sides may be described as three polygon sets in such a manner that three sides of the rectangular parallelepiped constitute one polygon set, one side constitutes one polygon set, and two sides constitute one polygon set. Since different material definitions can be coupled with the respective polygon sets, it is possible to draw the sides with different colors.

In the case where the texture mapping is designated in the material definition, the image according to the image data is texture-mapped onto the surface of coupled object.

In this embodiment, to be described later, the input image is set to be texture-mapped, for example, with respect to the material definition. Accordingly, the same input image may be texture-mapped onto all surfaces of the rectangular parallelepiped, or different input images polygons may be texture-mapped onto the surfaces thereof.

Hereinafter, a sample of a Collada file (partially extracted) as CG description data will be described. In this sample, for example, a material having the name (value) of "01 MatDefault" has been defined. The actual contents of the material are described so as to refer to an effect of "01 MatDefault-fx". Also, in <library_visual_scenes> of the sample, the drawing of the geometric information definition of "#Box01-lib" in relation to the material definition of "01 MatDefault" has been described.

Referring again to FIG. 1, the matrix switch 160 includes the image selection unit selectively extracting one image data from a plurality of input image data. The matrix switch 160 is composed of 9 input lines, four output bus lines 161 to 164, and cross-point switch groups 165 to 168.

The 9 input lines are arranged in one direction as shown in the drawing, and to the input lines, image data from a VTR, a video camera, and the like, is input. The four output bus lines 161 to 164 are arranged in a different direction, crossing the input lines. The cross-point switch group 165 performs connections at cross points where the 9 input lines and the output bus line 161 cross each other. The cross-point switch group 165 is controlled based on user's image selection manipulation, and any one of image data input to the 9 input lines is selectively output to the output bus line 161. The output bus line 161 configures an output line (an auxiliary output line) of image data L for texture mapping.

Also, the cross-point switch groups 166, 167, and 168 perform connections at cross points where the 9 input lines and the output bus lines 162, 163, and 164 cross each other. The cross-point switch groups 166, 167, and 168 are controlled based on the user's image selection manipulation, and any one of image data input to the 9 input lines is selectively output to the output bus lines 162, 163, and 164. The output bus lines 162, 163, and 164 configure output lines of image data OUT1, OUT2, and OUT3 for external output.

In this case, since the on/off operation of the respective cross-point switches of the cross-point switch groups 165 to 168 is to perform switching of the image data composed of a series of frame data, it is performed within a blanking period that is a gap between frames.

The image selection manipulation unit 170 receives a manipulation input of an instruction to the matrix switch 160. The image selection manipulation unit 170 is composed of press button lines which correspond to the respective output bus lines, and each button of the press button line corresponds to each input line.

FIG. 3 illustrates an example of an external appearance of an image selection manipulation unit (a manipulation table) 170. In the image selection manipulation unit 170, press button lines 171 to 174, which extend in left and right directions that correspond to the output bus lines 161 to 164, respectively, are installed in order in upward and downward directions. Each press button line is composed of alternative type press buttons that select connections of the respective input lines with the corresponding output bus lines, and the selected press button lights up.

On an upper part of the image selection manipulation unit (manipulation table) 170, a character display portion 175 is installed, and characters for identifying input images to the respective input lines are displayed. Also, on a left-side part of the image selection manipulation unit (manipulation table) 170, a character display portion 176 is installed, and characters for identifying the image data that is obtained from the output bus lines corresponding to the respective press button lines are displayed.

The image generation unit 140 generates a CG image that is a 3D space image based on the CG description data that is produced by the CG production unit 110. The image generation unit 140 generates an image of an animation frame in real time, rather than performing a rendering process with time.

The image generation unit 140, when the CG description data is read, maintains information such as respective definitions or the like and their corresponding portions as a data structure in a memory. The image generation unit 140 also maintains various values in a key frame for executing the animation in the memory.

For example, in order to draw polygon sets in geographic information of a certain node, the drawing is performed according to the designation of the colors or the like with reference to the geometric information and the corresponding material definitions. In the case of animation, the drawing is performed by proceeding with the current time for each frame and interpolating respective values before and after the key frame.

The surface designation unit 120 sends designation information of the surface or a predetermined polygon, which is the subject of texture mapping of an input image, to the image generation unit 140. The image generation unit 140 controls the image mapping unit 150 to perform texture mapping of the input image onto the surface of the predetermined polygon (polygon set) indicated by the designation information.

The image mapping unit 150 performs the texture mapping of an input image onto the surface of the polygon that is designated by the surface designation unit 120 among the polygons which are drawn by the image generation unit 140. The image mapping unit 150 is packaged in a body with the image generation unit 140, and is realized by the control through software on a CPU (Central Processing Unit) and the hardware operation of a GPU (Graphics Processing Unit) or the like. The control software designates the polygon set to be texture-mapped and instructs the hardware.

[Configuration Examples of an Image Generation Unit and an Image Mapping Unit]

FIG. 4 illustrates a detailed configuration example of an image generation unit 140 and an image mapping unit 150. The image generation unit 140 and the image mapping unit 150 include an image input/output unit 141, a GPU 142, a local memory 143, a CPU 144, and a main memory 145. The image generation unit 140 and the image mapping unit 150 also include a peripheral device control unit 146, a hard disc drive (HDD) 147, an Ethernet circuit 148a, and a network terminal 148b. The image generation unit 140 and the image mapping unit 150 also include a USB (Universal Serial Bus) terminal 149, and an SDRAM (Synchronous DRAM) 151. The Ethernet is a registered trademark.

The image input/output unit 141 inputs image data for performing the texture mapping, and outputs image data of a CG image onto which an image according to the image data has been appropriately texture-mapped. The image input/output unit 141 can input four system image data at maximum, and can output four system image data at maximum. In this case, the image data that is processed herein is image data of the HD-SDI (High Definition television-Serial Digital Interface) standard that has been prescribed as SMPTE292M. The GPU 142 and the main memory 145 can be equally accessed by the image input/output unit 141.

The main memory 145 functions as a work area of the CPU 144, and temporarily stores image data input from the image input/output unit 141. The CPU 144 controls all of the image generation unit 140 and the image mapping unit 150. The CPU 144 is connected to the peripheral device control unit 146. The peripheral device control unit 146 performs an interface process between the CPU 144 and peripheral devices.

The CPU 144 is connected to the built-in hard disc drive 147 through the peripheral device control unit 146. The CPU 144 is also connected to the network terminal 148b through the peripheral device control unit 146 and the Ethernet circuit 148a. The CPU 144 is also connected to a USB terminal 149 through the peripheral device control unit 146. Further, the CPU 144 is connected to the SDRAM 151 through the peripheral device control unit 146.

The CPU 144 performs the control of texture coordinates. That is, the CPU 144 performs a process for texture-mapping the image according to the input image data onto the surfaces of polygons which are drawn by the GPU 142. The GPU 142 generates a CG image based on the CG description data maintained in the hard disc drive 147 or the like, and if necessary, performs the texture mapping of the input image onto the surface of the designated subject of texture mapping. The local memory 143 functions as a work area of the GPU 142, and temporarily stores image data of the CG image prepared by the GPU 142.

The CPU 144 can access the local memory 143 in addition to the main memory 145. In the same manner, the GPU 142 can simultaneously access the local memory 143 and the main memory 145. The CG image data generated by the GPU 142 and first stored in the local memory 143 is sequentially read from the local memory 143, and then is output from the image input/output unit 141.

Figure 5:
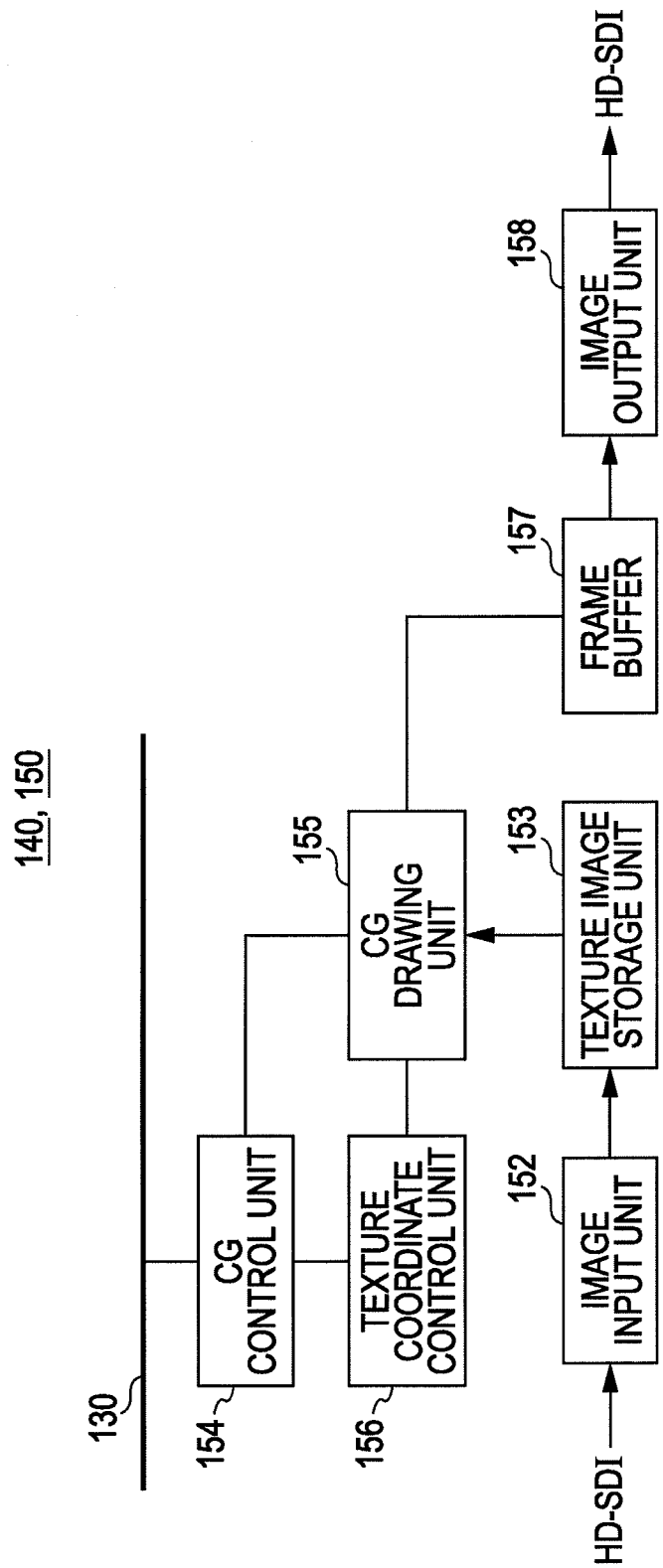
FIG. 5 is a diagram illustrating a configuration example of function blocks of an image generation unit and an image mapping unit.

FIG. 5 illustrates a configuration example of function blocks of the image generation unit 140 and the image mapping unit 150. The image generation unit 140 and the image mapping unit 150 have function blocks of an image input unit 152, a texture image storage unit 153, a CG control unit 154, a CG drawing unit 155, a texture coordinate control unit 156, a frame buffer 157, and an image output unit 158.

The image input unit 152 and the image output unit 158 is configured by the image input/output unit 141. Also, the texture image storage unit 153 is configured by the main memory 145. Also, the CG control unit 154 and the texture coordinate control unit 156 are configured by the CPU 144. Also, the CG drawing unit 155 is configured by the GPU 142. Also, the frame buffer 157 is configured by the local memory 143.

The image input unit 152 and the texture image storage unit 153 form a pair, and by increasing them, the image input systems can be increased. Also, the frame buffer 157 and the image output unit 158 form a pair, and by increasing them, the image output systems can be increased.

Figure 6A:
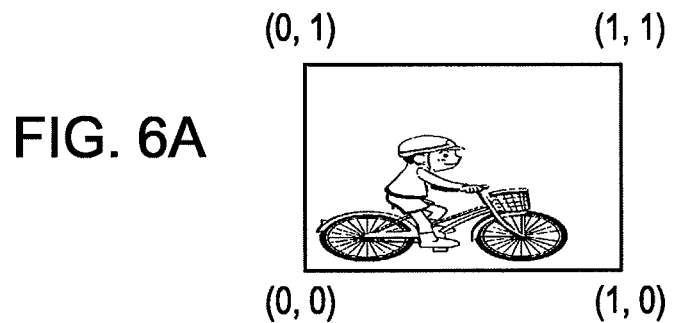
FIGS. 6A and 6B are diagrams illustrating an example of a texture image and a UV map when texture mapping is performed.
Figure 6B:
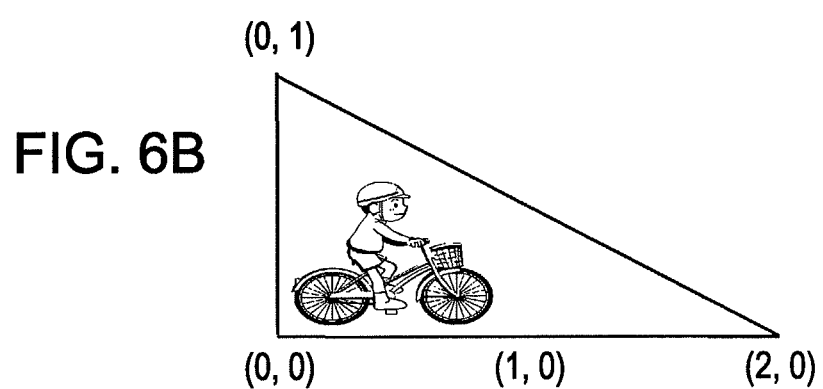

FIGS. 6A and 6B illustrate an example of a texture image and a UV map when texture mapping is performed. FIG. 6A shows a texture image, and FIG. 6B shows a UV map. Here, the UV map means a map that is indicated as coordinates on a ground in the case where the surface of a certain object (node) is considered as the ground. If it is assumed that this map is spread on a plane, a point (x, y) on the plane corresponds to a point (u, v) on the surface of the object. Due to this, by performing a process of attaching the texture image to the UV map, the texture mapping for attaching the texture image onto the surface of the object becomes possible. FIG. 6B illustrates a state in which the texture image is attached to the UV map.

The surface designation unit 120 designates the surface of the predetermined polygon onto which the input image is texture-mapped using the surfaces of polygons among the CG description data as a selection. Also, the surface designation unit 120 sends its designation information to the image generation unit 140 through the network 130. The surface designation unit 120, for example, is realized by a GUI (Graphical User Interface). Examples of a surface designation method are as follows.

(1) All polygon sets are displayed as a selection and a manipulator selects one among them.

(2) Nodes are displayed as a selection and a manipulator selects one among them. One node may include a plurality of polygon sets.

For example, if a cone is designated by polygon sets in a state where a bottom surface and a side surface of the cone are described as the polygon sets, respectively, the input image can be texture-mapped onto the bottom surface only. Also, if the cone is designated in the unit of a node, the same input image can be texture-mapped onto the bottom surface and the side surface. The correspondence between the input image and the position of each surface is designated by texture coordinates. In the CG description data, texture coordinates for each vertex of the polygon are described. The name of a character string that is given during the production of the CG production unit 110 corresponds to each polygon set and node. By displaying their character string as a selection, an environment in which easy manipulation is possible is provided.

(3) Material definitions are displayed as a selection and a manipulator selects one among them. In this case, by designating the material definitions, polygon surfaces onto which the input image is texture-mapped can be indirectly designated. That is, in this case, the polygon set which corresponds to the selected material definition becomes the subject of texture mapping of the input image.

For example, four following material definitions are included in the CG description data.
<material_phong1>
<material_lambert1>
<material_blinn1>
<material_blinn2>

The surface designation unit 120 displays the names of the four material definitions as the selection, and lets a manipulator, for example, select one among them. In this case, it is also possible that the number of selections is not limited to one. Examples of the CG description data may be a cone, a cylinder, a rectangular parallelepiped, and a triangular pyramid, and it is assumed that they correspond to the following materials.

Bottom surface of a cone: material_blinn1
Side surface of a cone: material_lambert1
Cylinder (on the whole): material_blinn2
Rectangular parallelepiped:
Bottom surface of a triangular pyramid: material_phong1
Side surface of a triangular pyramid: material_lambert1

With respect to the CG description data, it is assumed that the material definition "material_phong1" has been designated as the subject of texture mapping of the input image. In this case, in performing the drawing, the input image is texture-mapped onto the bottom surface of the triangular pyramid.

(4) One of surface information of the material definitions is displayed as a selection, and a manipulator selects one among them.

For example, the designation of conditions becomes possible with respect to "<diffuse> color" the quantity of reflected diffused light among surface information on the material definitions.

For example, if "diffuse" (reflected diffused light) of the material definition (material_blinn1) is
<diffuse>
  <color sid="diffuse">0.815686 0.588235 0.898039 1.000000</color>
</diffuse>,
RGBA become
R: 0.815686
G: 0.588235
B: 0.898039
AlphaMap: 1.000000.

The surface designation unit (GUI) 120 displays all values included in the material definitions of the CG description data being processed with respect to "diffuse" as a selection. Since this case corresponds to a color, it is sufficient if the color is actually displayed in addition to the numerical value.

If a manipulator selects the above-described value, an input image is texture-mapped onto the polygon set which corresponds to the material definition that includes the "diffuse" adopting the above-described value. In this case, even if a different material definition has the same "diffuse" value, the input image is texture-mapped onto the polygon set that corresponds to the material definition in the same manner. For example, if the "diffuse" values of the material definition "material_lambert1" are the same, the input image is texture-mapped onto the polygon set that corresponds to the material definition "material_lambert1" in the same manner.

Even if the equality sign is not established as the value determination, it is sufficient if comparison is performed in a state where the permitted limit is set. Since these values are floating-point values, the result of comparison by the complete equality sign may differ from that as intended. Accordingly, a certain range may be set, and the consistency may be determined through treatment of the range as an error. For example, under the assumption that "diffuse" in which the value of R is 0.815686 is designated, the subject of texture mapping is determined depending upon whether R of the "diffuse" is within a range of ±10%. That is, if R is between 0.815686×0.9 and 0.815686×1.1, it is determined that the values coincide with each other. In addition, a method of determining the permitted limit as an absolute value is also effective.

The above-described method in which the color of the surface is considered as a condition has an advantage or effect in manipulation. During the operation of the CG production unit (PC) 110, it is unable to see the situation of texture mapping. However, in many cases, even software on the PC displays the color of the designated surface as it is. By determining colors onto which input images are to be mapped, respectively, a manipulator can easily suppose which place the input image is to be put in on a provisional display screen of the CG being produced, and thus it is possible for the manipulator to imagine a final image.

(5) Image files in the respective material definitions in which texture mapping of image files of a still image has been designated are displayed as a selection and a manipulator selects one among them.

For example, it is assumed that the material definition "material_phong1" has been described to perform texture mapping of the image file grain_image.jpg. That is, it is assumed that the "diffuse" that corresponds to the material definition "material_phong1" has been described to use grain_image.jpg for texture. The surface designation unit (GUI) 120 displays the image files which have been used for texture mapping of the still image among the CG description data as a selection. If there is only grain_image.jpg, it is selected as the image file, while if other image files exist, one of them is selected to be displayed.

For example, it is considered that a manipulator has selected, for example, grain_image.jpg as the texture mapping designation of a moving image with respect to the input image. In this case, the texture mapping of the input image onto the polygon set that corresponds to the material definition that is described to perform texture mapping of this file as the still image is performed. In the case of using such a designation unit, during the operation of the CG production unit, the situation that the file grain_image.jpg of the still image is being texture-mapped can be seen. As a result, a manipulator can easily suppose which place the input image is to be put in on a provisional display screen of the CG being produced, and thus it is possible for the manipulator to imagine a final image.

Figure 7:
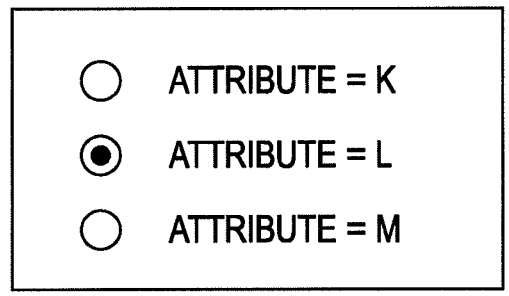
FIG. 7 is a diagram illustrating an example of GUI display of a surface designation unit.

FIG. 7 illustrates an example of GUI display of the surface designation unit 120. This GUI display example is a GUI example for designating attribute values and the surface of the polygon that performs indirect texture mapping of the input image. In this GUI display example, attribute value K, L, and M included in the CG description data are displayed as a selection, and a manipulator has selected the attribute=L.

In this case, through the manipulator's manipulation, an arbitrary attribute is set, for example, from a node (object), material definition, surface information on the material definition, and the like. The value (name) of the attribute set by the manipulator is extracted from the CG description data, and is displayed on the GUI display as a selection. In the GUI display example of FIG. 7, three selections are prepared. However, the number of selections is changed according to the number of values (names) of attributes extracted from the CG description data.

An operation example of the image processing apparatus 100 as illustrated in FIG. 1 will be described. The CG production unit 110 generates the CG description data for generating a predetermined CG image by the CG production software. The CG description data generated in the CG production unit 110 is sent to the image generation unit 140 and the surface designation unit 120 through the network 130.

In the surface designation unit (GUI) 120, a surface of a polygon among the CG description data becomes a selection, and the surface of a predetermined polygon that is the subject of texture mapping for texture-mapping the input image is designated. For example, in the surface designation unit (GUI) 120, the attribute for designating the surface of the predetermined polygon is set by a manipulator's manipulation. In this case, a certain attribute is set from the node (object), material definition, surface information on the material definition, and the like.

In the surface designation unit 120, the value (name) of the attribute set by the manipulator is extracted from the CG description data, and is displayed on the GUI display as a selection. Also, in the surface designation unit 120, one or plural values (names) are selected from the displayed selection by the manipulator's manipulation. This selection information is designation information of the surface of the predetermined polygon that is the subject to be texture-mapped, and is sent to the image generation unit 140 through the network 130.

Also, in the matrix switch 160, a press button line 171 of the image selection manipulation unit 170 is pressed by a manipulator, and thus any one of image data input to 9 input lines is selectively output as the image data L for texture mapping. The image data L for texture mapping that is obtained from the matrix switch 160 is sent to the image mapping unit 150.

The image generation unit 140 generates the CG image that is a 3D space image based on the CG description data produced by the CG production unit 110. Also, as described above, one or plural values (names) of the predetermined attributes are sent to the image generation unit 140 as the designation information of the surface of the predetermined polygon that is the subject for texture mapping. The image generation unit 140 controls the image mapping unit 150 to perform the texture mapping of the input image onto the surface of the polygon (a polygon set) that corresponds to one or plural values (names) of the predetermined attribute.

The image mapping unit 150, under the control of the image generation unit 140, performs the texture mapping of the image according to the image data L that is obtained by the matrix switch 160 onto the surface of the polygon that corresponds to one or plural values (names) of the predetermined attribute. From an output terminal 140a of the image generation unit 140, image data Vout of the CG image, which is obtained by texture-mapping the image according to the image data L onto the surface of the predetermined polygon, is output.

The flowchart of FIG. 8 schematically shows the processing order of the surface designation unit 120. The surface designation unit 120 starts the processing in step ST1, and proceeds to step ST2. In step ST2, the surface designation unit 120 acquires the CG description data which is prepared by the CG production unit 110 and is sent to the image generation unit 140. In this case, the surface designation unit 120 receives data sent from the CG production unit 110 as described above, or reads the data maintained in the image generation unit 140.

Then, the surface designation unit 120 lets a manipulator select the predetermined attribute for designating the surface of the polygon for texture mapping in step ST3. As described above, this attribute may be the node (object), material definition, surface information on the material definition, and the like. Also, in step ST4, the surface designation unit 120 extracts the value (name) of the predetermined attribute set by the manipulator in step ST3 from the CG description data acquired in step ST2 to display the value as a selection.

Then, the surface designation unit 120 lets the manipulator select one or plural values (names) from the selection of the predetermined attribute being displayed in step ST5. Also, the surface designation unit 120 sends the selection information of the value (name) of the predetermined attribute selected by the manipulator in step ST5 as the designation information of the surface of the predetermined polygon for the texture mapping of the input image in step ST6. Thereafter, the surface designation unit 120 ends the processing in step ST7.

The flowchart of FIG. 9 schematically shows the processing order of the image mapping unit 150. The image mapping unit 150 starts the processing in step ST11, and then proceeds to step ST12. In step ST12, the image mapping unit 150 receives mapping control information from the image generation unit 140. The mapping control information is based on the designation information of the surface of the predetermined polygon that is sent from the surface designation unit 120 to the image generation unit 140. That is, the mapping control information is information for controlling to perform the texture mapping of the input image onto the surface of the predetermined polygon (polygon set) that is indicated by the designation information.

Then, the image mapping unit 150 performs the texture mapping based on the mapping control information in step ST13. In this case, the image mapping unit 150 performs the texture mapping of the image according to the image data L for the texture mapping that is obtained from the matrix switch 160 onto the surface of the polygon (polygon set) that corresponds to the value (name) of the selected predetermined attribute. Thereafter, the image mapping unit 150 ends the processing in step ST14.

In the image processing apparatus 100 as illustrated in FIG. 1, the manipulator can designate the surface of the predetermined polygon that is the subject of texture mapping of the input image by setting the value (name) of the predetermined attribute through the surface designation unit 120. Also, the manipulator can change the image data L for the texture mapping that is obtained from the matrix switch 160 in certain timing by pressing the press button line 171 of the image selection manipulation unit 170. By changing the image data L as described above, the image that is texture-mapped onto the surface of the predetermined polygon of the CG image in the image mapping unit 150 is changed. Accordingly, the manipulator can select and synthesize a desired image with a desired surface of the CG image in certain timing.

Also, in the image processing apparatus 100 as illustrated in FIG. 1, the manipulator can perform the designation of the surface of the predetermined polygon that is the subject of texture mapping of the input image by setting the node (object), material definition, surface information on the material definition, and the like. Accordingly, the apparatus has the following advantages and effects. During the operation of the CG production unit (PC) 110, it is unable for the manipulator to see the situation of texture mapping. However, in many cases, even software on the PC displays the color of the designated surface as it is. Accordingly, by determining onto which attribute the input image is to be texture-mapped, the manipulator can easily suppose in which place the input image is to be put on a provisional display screen of the CG being produced, and thus it is possible for the manipulator to imagine a final image. Also, since the attribute of the surface differs for each typical material definition, the same effect can be obtained in the case where the material definition is selected and texture-mapped.

As described above, an animation may be included in the CG description data, and the proceeding (which means repetition) of this animation may be manipulated during operation by a separate manipulation unit (the explanation thereof will be omitted). Accordingly, for example, using live broadcasting of a sports game, the image selection unit can select and perform the texture mapping of a plurality of image data sent from a plurality of cameras according to the situation of the game while manipulating the proceeding (direction, speed, repetition, start and stop) of the CG animation. Accordingly, two characteristics, i.e. the visual effect of the CG animation and the selection of an attention image of the game through an appropriate image switching of the live broadcasting, can be displayed, and thus the high value-added broadcasting can be achieved.

<2. Second Embodiment>

[Configuration of an Image Processing Apparatus]

The second embodiment of the present invention will be described. FIG. 10 illustrates a configuration of an image processing apparatus 100A according to the second embodiment. In FIG. 10, the same reference numerals are given to the portions corresponding to those in FIG. 1, and the description thereof will be appropriately omitted. The image processing apparatus 100A includes a CG production unit 110, a surface designation unit 120A, a network 130, an image generation unit 140A, and an image mapping unit 150A. Also, the image processing apparatus 100A includes a matrix switch 160A, an image selection manipulation unit 170A, and a program preview mixer 180. The CG production unit 110, the surface designation unit 120A, the image generation unit 140A, and the image selection manipulation unit 170A are connected to the network 130, respectively.

The CG production unit 110 is configured by a PC (Personal Computer) having CG production software. The CG production unit 110 outputs CG description data of a predetermined format. The CG production unit 110 is the same as the CG production unit 110 of the image processing apparatus 100 as illustrated in FIG. 1.

The matrix switch 160A constitutes the image selection unit selectively extracting image data from a plurality of input image data. The matrix switch 160A is composed of 10 input lines, 13 output bus lines 211 to 223, and cross-point switch groups 231 to 243. The matrix switch 160A constitutes a portion of an effect switcher, and is used to supply the image data to the image mapping unit 150A as an external device and to supply the image data to an internal image synthesis unit or the like.

The output bus lines 211 to 214 are bus lines for supplying the image data to the image mapping unit 150A. Also, the output bus lines 215 to 221 are bus lines for outputting the image data to the outside. Also, the output bus lines 222 and 223 are bus lines for supplying the image data to an internal image synthesis unit (mixer).

The 10 input lines are arranged in one direction. To the input lines "1" to "9", the image data from a VTR, a video camera, and the like, is input. To the input line "10", the CG image data output from the image generation unit 140A is input. The 13 output bus lines 211 to 223 are arranged in a different direction, crossing the input lines.

The cross-point switch groups 231 to 234 perform connections at cross points where the 10 input lines and the output bus lines 211 to 214 cross each other. The connections of the cross-point switch groups 231 to 234 are controlled based on a user's image selection manipulation, and any one of image data input to the 10 input lines is selectively output to the output bus lines 211 to 214. The output bus lines 211 to 214 configure output lines of the image data (mapping input) T1 to T4 for texture mapping.

Also, the cross-point switch groups 235 to 241 perform connections at cross points where the 10 input lines and the output bus lines 215 to 221 cross each other. The cross-point switch groups 235 to 241 are controlled based on the user's image selection manipulation, and any one of image data input to the 10 input lines is selectively output to the output bus lines 215 to 221. The output bus lines 215 to 221 configure output lines of image data OUT1 to OUT7 for external output.

Also, the cross-point switch groups 242 and 243 perform connections at cross points where the 10 input lines and the output bus lines 222 and 223 cross each other. The cross-point switch groups 242 and 243 are controlled based on the user's image selection manipulation, and any one of image data input to the 10 input lines is selectively output to the output bus lines 222 and 223.

The image data output from the output bus lines 222 and 223 are input to the program preview mixer 180. This program preview mixer 180 performs synthesis of the image data input from the output bus lines 222, and 223. The program (PGM) output is output from the program preview mixer 180 to the outside through the program output line 251, and the preview output is output to the outside through the preview output line 252.

In this case, since the on/off operation of the respective cross-point switches of the cross-point switch groups 231 to 243 is to perform switching of the image data composed of a series of frame data, it is performed within a vertical blanking period that is a gap between frames.

The image selection manipulation unit 170A receives a manipulation input of an instruction to the matrix switch 160A. The image selection manipulation unit 170A is composed of a manipulation table 260 having press button lines for manipulating the on/off operation of the switches of the respective cross-point switch groups of the matrix switch 160A.

FIG. 11 illustrates an example of an external appearance of a manipulation table 260. In the manipulation table 260, press button lines 261 to 264, which extend in left and right directions, are installed in order in upward and downward directions. Each press button line is set to correspond to any one of 13 output bus lines of the matrix switch 160A. Each press button line is composed of alternative type press buttons that select connections of the respective input lines to the corresponding output bus lines, and the selected press button lights up.

On an upper part of the manipulation table 260, a character display portion 265 is installed to display characters for identifying input images to the respective input lines. The character display portion 265, for example, may be composed of a display device such as an LCD (Liquid Crystal Display) or the like. Also, on a left-side part of the manipulation table 260, a character display portion 266 is installed. The character display portion 266 displays characters for identifying the output bus lines that correspond to the respective press button lines. The character display portion 266, for example, may be composed of a display device such as an LCD or the like.

To correspond to the press button line assigned to the output bus line that supplies the mapping input to the image mapping unit 150A, the value (name) of the predetermined attribute selected by a user's manipulation to be described later is displayed. The value (name) of the predetermined attribute is information (surface designation information) that designates the surface of the polygon (polygon set) for texture-mapping the image according to the image data (mapping input) obtained on the corresponding output bus line.

In FIG. 11, characters of "Metal-1", which is the name of a material definition that is one attribute, are displayed to correspond to the press button line 261 in the character display portion 266. Also, in FIG. 11, characters of "Material-Def3", which is the name of a material definition that is one attribute, are displayed to correspond to the press button line 264 in the character display portion 266.

Which output bus lines the press button lines 261 to 264 of the manipulation table 260 correspond to is realized by, for example, a GUI (Graphical User Interface). FIG. 12A illustrates an example of GUI display that is displayed during assignment of the output bus lines. In this GUI display, four press button lines 261 to 264 are indicated as "1" to "4". A manipulator displays the selection of the output bus lines by manipulating a "Select button" corresponding to the lines "1" to "4", and selects a desired output bus line from the selection to assign a desired output bus line to the respective press button line.

FIG. 12B illustrates an example of GUI display that is displayed during selection of the output bust line. In this GUI display, the output bus lines 215 to 221 that constitute the output lines of the image data OUT1 to OUT7 for external outputs are displayed as selections on "OUT1" to "OUT7". Also, in this GUI display, the output bus lines 222 and 223 for inputting the image data to the program preview mixer 180 are displayed as the selection on "PP-A" and "PP-B".

Also, in the GUI display, a value (name) of a predetermined attribute is displayed as a selection in order to allocate a press button line to the output bus lines 211 to 214 that form output lines of image data (mapping input) T1 to T4 for texture mapping. By a manipulator's manipulation, a certain attribute is set, for example, from the node (object), material definition, surface information on the material definition, and the like. Here, the manipulator sets attributes for performing the designation of the surfaces of the predetermined polygon that is the subject of texture mapping of the input image. In another example, one attribute may be set in the system.

The image selection manipulation unit 170A extracts the value (name) of the set attribute from the CG description data generated from the CG production unit 110, and displays the extracted value as a selection on the GUI display. In the GUI display example of FIG. 12B, material definitions are set as attributes, and names of the material definitions are displayed as selections. "Metal-1", "Metal-2", "Material-Def1", "Material-Def2", and "Material-Def3" are the names of the material definitions.

In the GUI display example of FIG. 12A, "OUT1" and "OUT2" are selected for "2" and "3". In this case, the press button lines 262 and 263 correspond to the output bus lines 215 and 216. Also, in the GUI display example of FIG. 12A, "Metal-1" and "Material-Def3" are selected for "1" and "4".

As described above, the matrix switch 160A has 13 output bus lines, and the respective output bus lines are specified by bus numbers "1" to "13". Also, as described above, the output bus line numbers 1 to 4 of the matrix switch 160A input the mapping inputs (image data) T1 to T4 to the image mapping unit 150A. The image selection manipulation unit 170A or a surrounding microprocessor has a mapping input correspondence table as illustrated in FIG. 13, in which line connections are stored. The mapping input correspondence table stores settings that correspond to the line connections, and would not be changed unless the line connections are changed.

If the value (name) of the predetermined attribute is selected with respect to a certain press button line as shown as "1" or "4" in FIG. 12A, the image selection manipulation unit 170A assigns the press button lines to an output bus line that has not yet been assigned among bus numbers 1 to 4. In this case, the output bus lines are output bus lines for outputting image data of images which are texture-mapped onto the surfaces of the polygon (polygon set) corresponding to the values (names) of the selected attributes. Also, the image selection manipulation unit 170A sends information on the values (names) of the selected attributes and information on which one of the mapping inputs T1 to T4 is the mapping input by the output bus line of the subject of assignment to the surface designation unit 120A through the network 130.

As illustrated in FIG. 12A, it is exemplified that "Metal-1" is selected for "1" and then "Material-Def3" is selected for "4", and further explanation in this case will be made.

First, when "Metal-1" is selected for "1", the image selection manipulation unit 170A assigns the press button line 261 to the output bus line 211. In this case, the output bus line 211 becomes an output bus line for outputting image data of an image which will be texture-mapped onto the surface of the polygon (polygon set) that corresponds to the material definition "Metal-1". Also, the image selection manipulation unit 170A sends the material definition "Metal-1" and information on the mapping input T1 to the surface designation unit 120A through the network 130.

Next, when "Material-Def3" is selected for "4", the image selection manipulation unit 170A assigns the press button line 264 to the output bus line 212. In this case, the output bus line 212 becomes an output bus line for outputting image data of an image which will be texture-mapped onto the surface of the polygon (polygon set) that corresponds to the material definition "Material-Def3". Also, the image selection manipulation unit 170A sends the material definition "Material-Def3" and information on the mapping input T2 to the surface designation unit 120A through the network 130.

In this case, the manipulation table 260 as illustrated in FIG. 11 appears to have four press button lines 261 to 264. However, it is considered that five or more press button lines are provided. In this case, the number of press button lines for selecting the values (names) of the specified attributes is four at maximum. This is because the image processing apparatus 100A as illustrated in FIG. 10 has four output bus lines for supplying the mapping inputs (image data) to the image mapping unit 150A.

Also, as described above, it is exemplified that only one value (name) of the predetermined attribute is selected for a certain press button line. It is also considered to permit selection of a plurality of values (names) with respect to a certain press button line. In this case, an image according to output image data of the output bus line to which a certain press button line has been assigned is texture-mapped onto surfaces of all polygons (polygon sets) corresponding to any one of the plurality of values (names) of the predetermined attributes. In this case, in the character display portion 266 (see FIG. 11) that corresponds to the respective press button lines, a plurality of values (names) of attributes is displayed. However, if it is difficult to display the plurality of attribute values (names), one or more values as many as possible are displayed.

Also, as described above, it is exemplified that the character display portion 266 is arranged to correspond to the press button lines of the manipulation table 260. However, it is also possible to arrange four same indicators in different places and to display which places the four images have been mapped on as reference information.

The surface designation unit 120A, as described above, is sent from the image selection manipulation unit 170A. Based on the correspondence information between the selected attribute values (names) and the mapping inputs, an image assignment table that indicates the correspondence relationship between the attribute values (names) and the mapping inputs is prepared. Also, the surface designation unit 120A sets the image assignment table in the image generation unit 140A through the network 130.

By setting the image assignment table as described above, the surface designation unit 120A designates the surfaces of the polygon (polygon set) for texture-mapping the image according to the mapping inputs for each output bus line that outputs the mapping inputs T1 to T4. In this case, the surfaces of the polygon (polygon set) for texture mapping the image according to the mapping inputs are designated by the attribute values (names).

FIG. 14A illustrates an example of an image assignment table. As described above, this example is an example in which "Metal-1" is selected for "1" and "Material-Def3" is selected for "4", as illustrated in FIG. 12A, in the image selection manipulation unit 170A. Also, FIG. 14B illustrates another example of an image assignment table. As described above, this example is an example in which "Metal-1" and "Material-Def2" are selected for "1" and "Material-Def3" is selected for "4", in the image selection manipulation means 170A. In this image assignment table, T1 to T4 constitute an image identifier.

The image generation unit 140A generates a CG image that is a 3D space image based on the CG description data that is produced by the CG production unit 110. The image generation unit 140A, when the CG description data is read, maintains information such as respective definitions or the like and their corresponding portions as a data structure in a memory. The image generation unit 140A also maintains various values in a key frame for executing the animation in the memory.

For example, in order to draw polygon sets in geographic information of a certain node, the drawing is performed according to the designation of the colors or the like with reference to the geometric information and the corresponding material definitions. In the case of an animation, the drawing is performed by proceeding with the current time for each frame, interpolating, and determining respective values before and after the key frame, from the current time.

In the surface generation unit 140A, as described above, the image assignment table is set by the surface designation unit 120A (see FIGS. 14A and 14B). The image generation unit 140A controls the image mapping unit 150A to perform texture mapping of the image according to the mapping input which constitutes a pair together with the attribute value (name) onto the surfaces of the polygon (polygon set) corresponding to the respective attribute values (names) that exist in the table.

The image mapping unit 150A performs the texture mapping of an input image onto the surfaces of the polygon (polygon set) corresponding to the respective attribute values (names) that exist in the image assignment table set by the image generation unit 140A among the polygons which are drawn by the image generation unit 140A. To the image mapping unit 150A, as described above, the mapping inputs T1 to T4 which are image data for texture mapping from the matrix switch 160A are supplied. The image mapping unit 150A, under the control of the image generation unit 140A, performs texture mapping of the images according to the mapping inputs which constitute a pair together with the attribute values (names) onto the surfaces of polygon (polygon set) that corresponds to the respective attribute values (names) existing in the image assignment table.

The image mapping unit 150A is packaged in a body with, for example, the image generation unit 140A, and is realized by the control through software on a CPU and the hardware operation of a GPU or the like. The control software designates the polygon set to be texture-mapped and instructs the hardware. Although the detailed description will be omitted, the image mapping unit 150A and the image generation unit 140A are configured in the same manner as the image mapping unit 150 and the image generation unit 140 of the image processing apparatus 100 as illustrated in FIG. 1 (see FIGS. 4 and 5).

An operation example of the image processing apparatus 100A as illustrated in FIG. 10 will be described. The CG production unit 110 generates the CG description data for generating a predetermined CG image by the CG production software. The CG description data generated by the CG production unit 110 is sent to the image generation unit 140A and the image selection manipulation unit 170A through the network 130.

The image selection manipulation unit 170A performs assignment of the press button lines of the manipulation table 260 to the output bus lines 211 to 214 that forms the output lines of the image data (mapping inputs) T1 to T4 for texture mapping through the manipulator's manipulation. In this case, by selecting the predetermined attribute values (names) for each press button line, the assignment is performed in order from the output bus line 211. Since the manipulation table 260 is provided with four press button lines 261 to 264, one press button line can be assigned to the whole output bus lines 211 to 214 at maximum.

The image selection manipulation unit 170A sets the attributes for assigning the surfaces of the predetermined polygon that is the subject of texture mapping of the input image through the manipulator's manipulation. Here, the attribute may be the node (object), material definition, surface information on the material definition, and the like. The predetermined attribute is an attribute which has been set by the manipulator's manipulation or an attribute which has been set in the system, and the value (name) of the selected attribute is extracted from the CG description data generated by the CG production unit 110.

With respect to the output bus lines to which the press button lines of the manipulation table 260 are assigned among the output bus lines 211 to 214 of the matrix switch 160A, their output image data (mapping inputs) can be changed through manipulation of the corresponding press button line. In this case, any one of the image data input to the 10 input lines is selectively output as the output image data. For example, if the press button line 261 of the manipulation table 260 is assigned to the output bus line 211 of the matrix switch 160A, the manipulator can change the mapping input T1 of the image mapping unit 150A in certain timing through the manipulation of the press button line 261.

If the press button line of the manipulation table 260 is assigned to any one of the output bus lines 211 to 214 as described above, information is sent from the image selection manipulation unit 170A to the surface designation unit 120A through the network 130. This information includes information on the values (names) of the selected predetermined attributes and information on which one of the mapping inputs T1 to T4 is the mapping input by the output bus line of the subject of assignment.

The surface designation unit 120A sets the image assignment table that indicates the correspondence relationship between the attribute value (name) and the mapping input based on the correspondence information between the value (name) of the selected attribute and the mapping input, which are sent from the image selection manipulation unit 170A. The image assignment table is set in the image generation unit 140A through the network 130. In the surface designation unit 120A, the surfaces of the polygon (polygon set) for texture-mapping the image according to the respective mapping input are designated by the attribute values (names) through the setting of the image assignment table.

The image generation unit 140A generates the CG image that is a 3D space image based on the CG description data produced by the CG production unit 110. Also, as described above, in the image generation unit 140A, the image assignment table is set by the surface designation unit 120A. The image generation unit 140A controls the image mapping unit 150A to perform the texture mapping of the image according to the mapping input that constitutes a pair together with the attribute value (name) onto the surface of the polygon (a polygon set) that corresponds to the respective attribute values (names) in the table.

The image mapping unit 150A, under the control of the image generation unit 140A, performs the texture mapping of the image according to the mapping input that constitutes a pair together with the attribute value (name) onto the surface of the polygon (polygon set) that corresponds to the respective attribute values (names) existing in the table. From an output terminal 140a of the image generation unit 140A, image data Vout of the CG image, which is obtained by texture-mapping the image onto the surface of the predetermined polygon, is output. In this case, even to the input line "10" of the matrix switch 160A, image data of the CG image, which is obtained by texture-mapping the image onto the surface of the predetermined polygon and which is output from the image generation unit 140A, is input.

The flowchart of FIG. 15 schematically shows the processing order of the image selection manipulation unit 170A. The image selection manipulation unit 170A starts the processing in step ST21, and proceeds to step ST22. In step ST22, the image selection manipulation unit 170A acquires the CG description data which is prepared by the CG production unit 110 and is sent to the image generation unit 140A. In this case, the image selection manipulation unit 170A receives data sent from the CG production unit 110 as described above, or reads the data maintained in the image generation unit 140A.

Then, the image selection manipulation unit 170A lets a manipulator select the predetermined attribute for designating the surface of the polygon for texture mapping in step ST23. As described above, this attribute may be the node (object), material definition, surface information on the material definition, and the like. Also, in step ST24, the image selection manipulation unit 170A extracts the whole values (names) of the predetermined attribute set by the manipulator in step ST23 from the CG description data acquired in step ST22 to display the value as a selection.

Then, the image selection manipulation unit 170A, in step ST25, performs the GUI display which includes the extracted predetermined attribute values (names) as selections, and lets the manipulator perform an output bus assignment that assigns the press button line of the manipulation table 260 to any one of the output bus lines. By this output bus assignment, the press button line of the manipulation table 260 is assigned to any one of the output bus lines 211 to 214 for supplying the mapping inputs T1 to T4 to the image mapping unit 150A.

Then, in step ST26, the image selection manipulation unit 170A sends the correspondence information between the selected attribute value (name) and the mapping input to the surface designation unit 120A. Thereafter, the image selection manipulation unit 170A ends the processing in step ST27.

The flowchart of FIG. 16 schematically shows the processing order of the surface designation unit 120A. The surface designation unit 120A starts the processing in step ST31, and proceeds to step ST32. In step ST32, the surface designation unit 120A receives correspondence information between the selected attribute value (name) and the mapping input, which is sent from the image selection manipulation unit 170A.

Then, in step ST33, the surface designation unit 120A prepares an image assignment table that indicates the correspondence relationship between the attribute value (name) and the mapping input based on the correspondence information received in step ST32, and set the table in the image generation unit 140A. Thereafter, the surface designation unit 120A ends the processing in step ST34.

Figure 17:
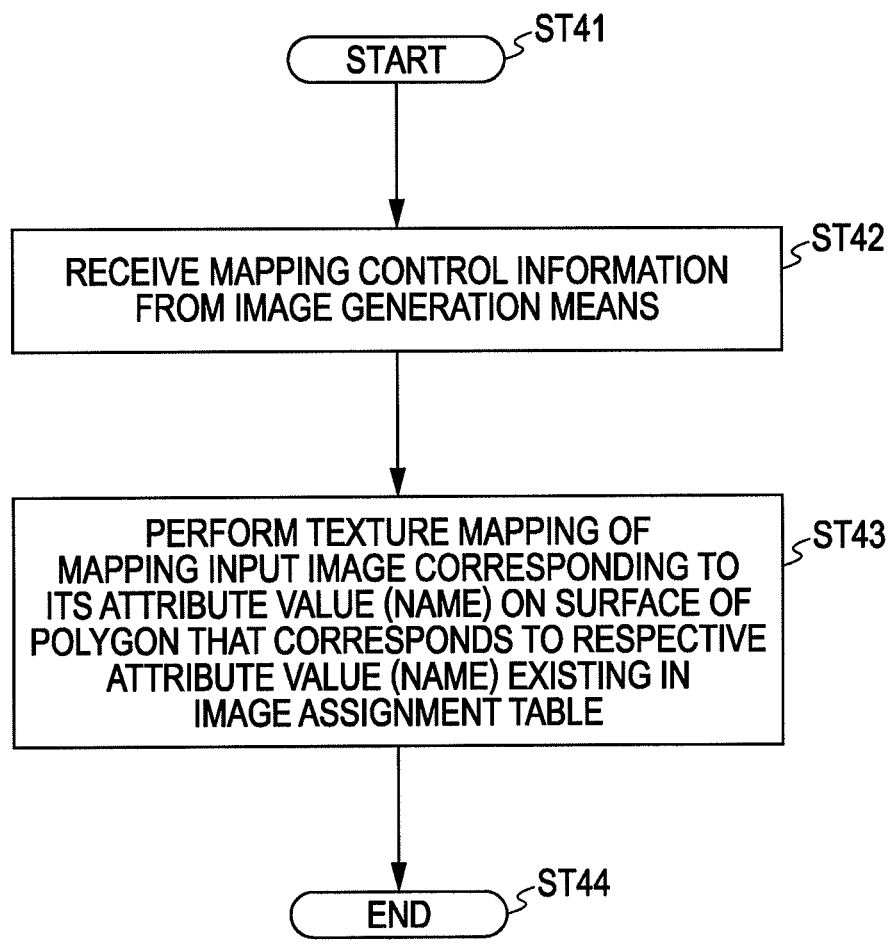
FIG. 17 is a flowchart schematically illustrating a processing order of an image mapping unit.

The flowchart of FIG. 17 schematically shows the processing order of the image mapping unit 150A. The image mapping unit 150A starts the processing in step ST41, and then proceeds to step ST42. In step ST42, the image mapping unit 150A receives mapping control information from the image generation unit 140A. The mapping control information is based on the image assignment table set by the surface designation unit 120A. That is, the control information is information for controlling to perform the texture mapping of the image according to the mapping input that constitutes a pair together with the attribute value (name) onto the surface of the polygon (polygon set) that corresponds to the respective attribute values (names) existing on the image assignment table.

Then, in step ST43, the image mapping unit 150A performs the texture mapping based on the mapping control information. In this case, the image mapping unit 150A performs the texture mapping of the image according to the mapping input that constitutes a pair together with the attribute value (name) onto the surface of the polygon (polygon set) corresponding to the value (name) of the respective attribute that exists in the image assignment table. Thereafter, the image mapping unit 150A ends the processing in step ST44.

Figure 18:
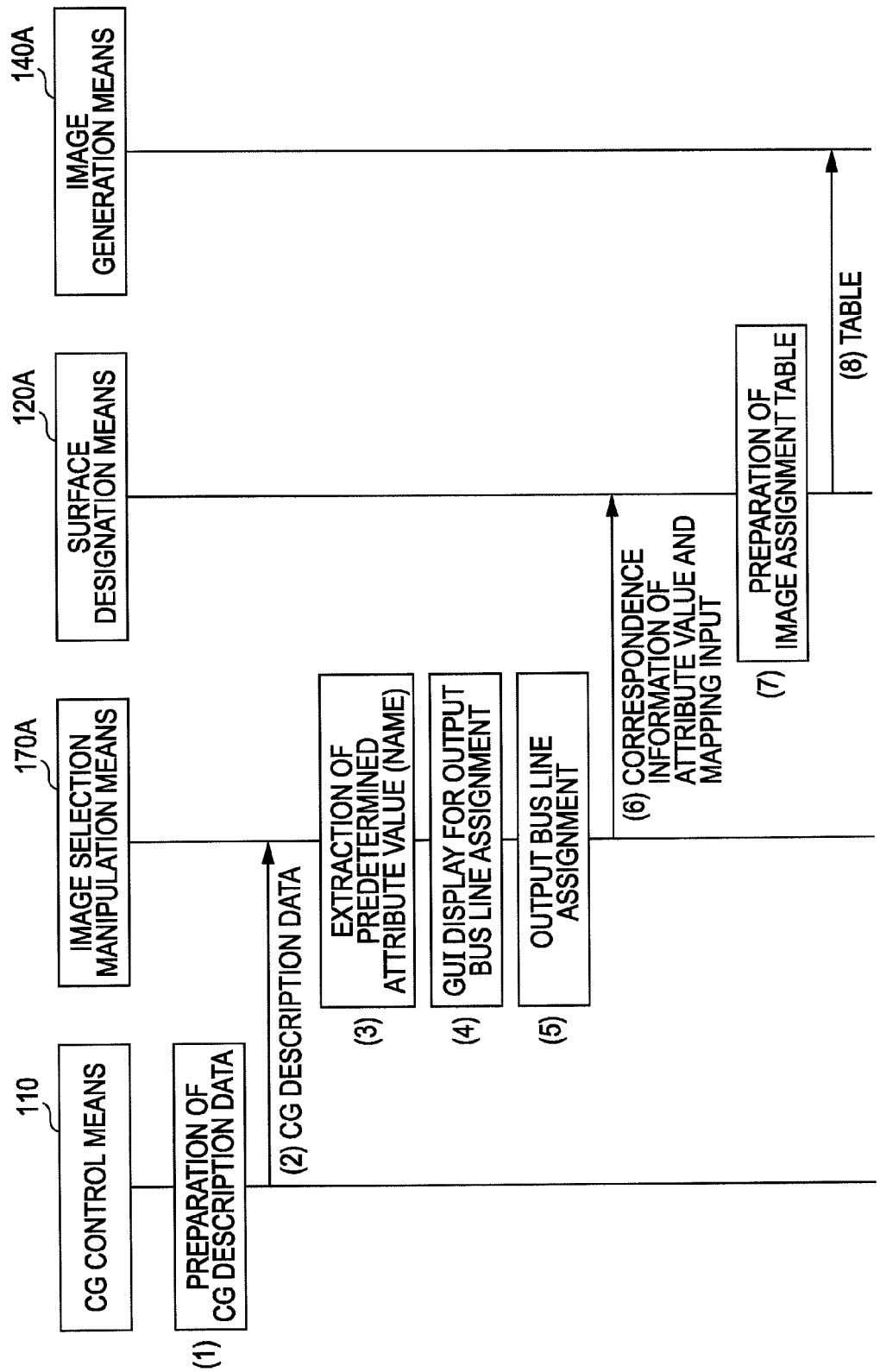
FIG. 18 is a sequence diagram illustrating communication sequence until an image assignment table is set in an image generation unit.

FIG. 18 is a sequence diagram illustrating communication sequence until an image assignment table is set in an image generation unit 140A.

(1) The CG production unit 110 generates The CG description data for generating the CG image.

(2) The CG production unit 110 sends the CG description data to the image selection manipulation unit 170A.

(3) The image selection manipulation unit 170A lets a manipulator select a predetermined attribute for designating the surfaces of the polygon for texture mapping and extracts the attribute values (names) from the CG description data.

(4) Then, the image selection manipulation unit 170A performs GUI display for assigning the output bus line that includes the extracted predetermined attribute values (names) as selections.

(5) Then, the image selection manipulation unit 170A lets the manipulator to perform an output bus assignment using the GUI display. By this output bus assignment, the press button line of the manipulation table 260 is assigned to any one of the output bus lines 211 to 214 that supplies the mapping inputs T1 to T4 to the image mapping unit 150A.

(6) The image selection manipulation unit 170A sends the correspondence information between the selected attribute value (name) and the mapping input to the surface designation unit 120A based on the correspondence information sent from the image selection manipulation means 170A.

(7) The surface designation unit 120A prepares the image assignment table that indicates the correspondence relationship between the attribute value (name) and the mapping input on the basis of the correspondence information which is transmitted from the image selection manipulation unit 170A.

(8) Then, the surface designation unit 120A sets the image assignment table in the image generation unit 140A.

In the image processing apparatus 100A as illustrated in FIG. 10, The image selection manipulation unit 170A can designate the surfaces of the predetermined polygon that is the subject of texture mapping of the input image while the output bus line assignment for assigning the respective press button lines of the manipulation table 260 to the output bus lines is performed. That is, the manipulator selects the predetermined attribute values (names), and assigns the press button line of any one manipulation table 260 among the output bus lines 211 to 214 that supply the mapping inputs T1 to T4 to the image mapping unit 150A. In this case, the correspondence information between the selected attribute value (name) and the mapping input is sent from the image selection manipulation unit 170A to the surface designation unit 120A. Also, the surface designation unit 120A sets the image assignment table that indicates the correspondence relationship between the attribute value (name) and the mapping input in the image generation unit 140A.

Also, the manipulator can change the image data as the mapping input that exists in the image assignment table in certain timing by pressing the press button line of the image selection manipulation unit 170A. As the mapping input is changed, the image that is texture-mapped onto a desired surface of the CG image is changed in the image mapping unit 150A. Accordingly, the manipulator can select and synthesize a desired image with a desired surface of the CG image.

Figure 19B:
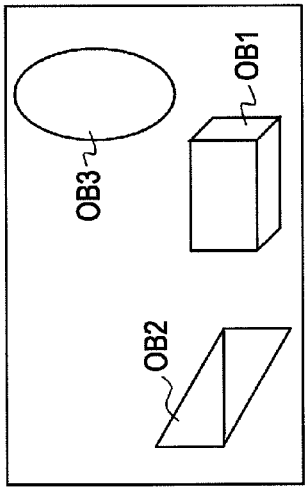
FIGS. 19A to 19H are diagrams illustrating an example for which images, which are texture-mapped onto surfaces of a plurality of objects, are changed in predetermined timing.
Figure 19D:
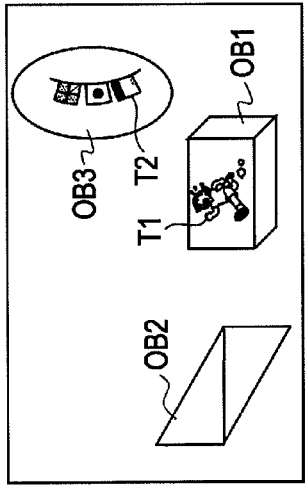
Figure 19H:
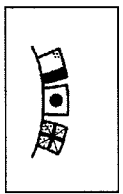
Figure 19G:
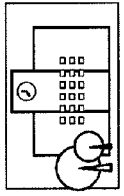
Figure 19A:
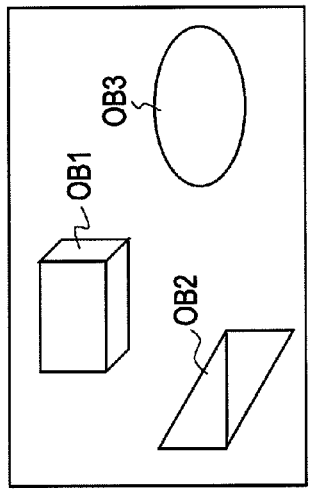

Referring to FIGS. 19A to 19H, an example of images which are texture-mapped onto surfaces of plural objects and which are changed in predetermined timing will be described. FIGS. 19A and 19B illustrate an example of a CG image in which three objects OB1 to OB3 are drawn and moved on a screen by their animations. FIG. 19A shows an image at time t1, and FIG. 19B shows an image at time t2 during the proceeding of the animation.

Figure 19C:
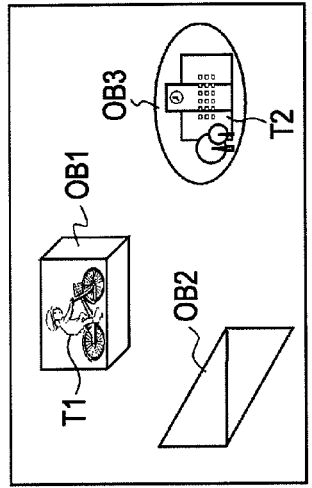
Figure 19F:
Figure 19E:

In the image processing apparatus 100A as illustrated in FIG. 10, at time t1 and at time t2, by the manipulator's manipulation of the press button line, images by different image data can be in a texture-mapped state on a surface of the same object. That is, at time t1, as illustrated in FIG. 19C, an image T1 (an image by the mapping input T1) as illustrated in FIG. 19E is texture-mapped onto the surface of the object OB1. Also, at time t1, an image T2 (an image by the mapping input T2) as illustrated in FIG. 19F is texture-mapped onto the surface of the object OB3.

Then, before the proceeding of the animation reaches the time t2, the image according to the mapping inputs T1 and T2 is changed by the operator's manipulation through the image selection manipulation unit 170A. As a result, at time t2, as shown in FIG. 19D, the image T1 as shown in FIG. 19G is texture-mapped onto the surface of the object OB1, and the image T2 as shown in FIG. 19H is texture-mapped on the surface of the object OB3. At this time, although the images as shown in FIGS. 19E and 19H are moving images, they are considered as unchanged images for convenience in explanation.

Also, in the image processing apparatus 100A as illustrated in FIG. 10, the manipulator can perform the designation of the surface of the predetermined polygon that is the subject of texture mapping of the input image by setting attributes such as the node (object), material definition, surface information on the material definition, and the like. Accordingly, the apparatus has the following advantages and effects. During the operation of the CG production unit (PC) 110, it is unable for the manipulator to see the situation of texture mapping. However, in many cases, even software on the PC displays the color of the designated surface as it is. Accordingly, by determining onto which attribute the input image is to be texture-mapped, the manipulator can easily suppose in which place the input image is to be put on a provisional display screen of the CG being produced, and thus it is possible for the manipulator to imagine a final image.

Also, in the image processing apparatus 100A as illustrated in FIG. 10, a plurality of press button lines of the manipulation table 260 of the image selection manipulation unit 170A can be assigned to the output bus lines which supply the mapping inputs to the image mapping unit 150A. In this case, in the image assignment table set in the image generation unit 140A, the correspondence relationship between the plural mapping inputs and the attribute values (names) is indicated. In this case, surfaces of the polygon (polygon set) for inputting images for respective mapping inputs are designated. Accordingly, desired images can be selected and synthesized with the plural surfaces of the CG image at certain timing by the image mapping unit 150A.

Also, in the image processing apparatus 100A as illustrated in FIG. 10, on a left portion of the manipulation table 260 of the image selection manipulation unit 170A, the character display portion 266 is installed, and characters for identifying the output bus lines corresponding to the respective press button lines are displayed. Also, predetermined attribute values (names) selected by the user's manipulation are displayed corresponding to the press button lines allocated to the output bus lines that supply the mapping inputs to the image mapping unit 150A. The predetermined attribute values (names) correspond to information (surface designation information) which designates the surface of the polygon (polygon set) for texture-mapping the image according to the image data (mapping input) that is obtained from the corresponding output bus. Accordingly, the manipulator can easily recognize what information (the attribute value (name)) the surface of the CG image, onto which the image according to the mapping outputs from the output bus lines that correspond to the press button lines is texture-mapped, is designated with.

<3. Modifications>

In the above-described second embodiment, the manipulation table 260 that constitutes the image selection manipulation unit 170A, as illustrated in FIG. 11, is provided with four press button lines 261 to 264. The respective press button line is set to correspond to any one of the 13 output bus lines of the matrix switch 160A through the manipulator's advanced setting manipulation.

Figure 20:
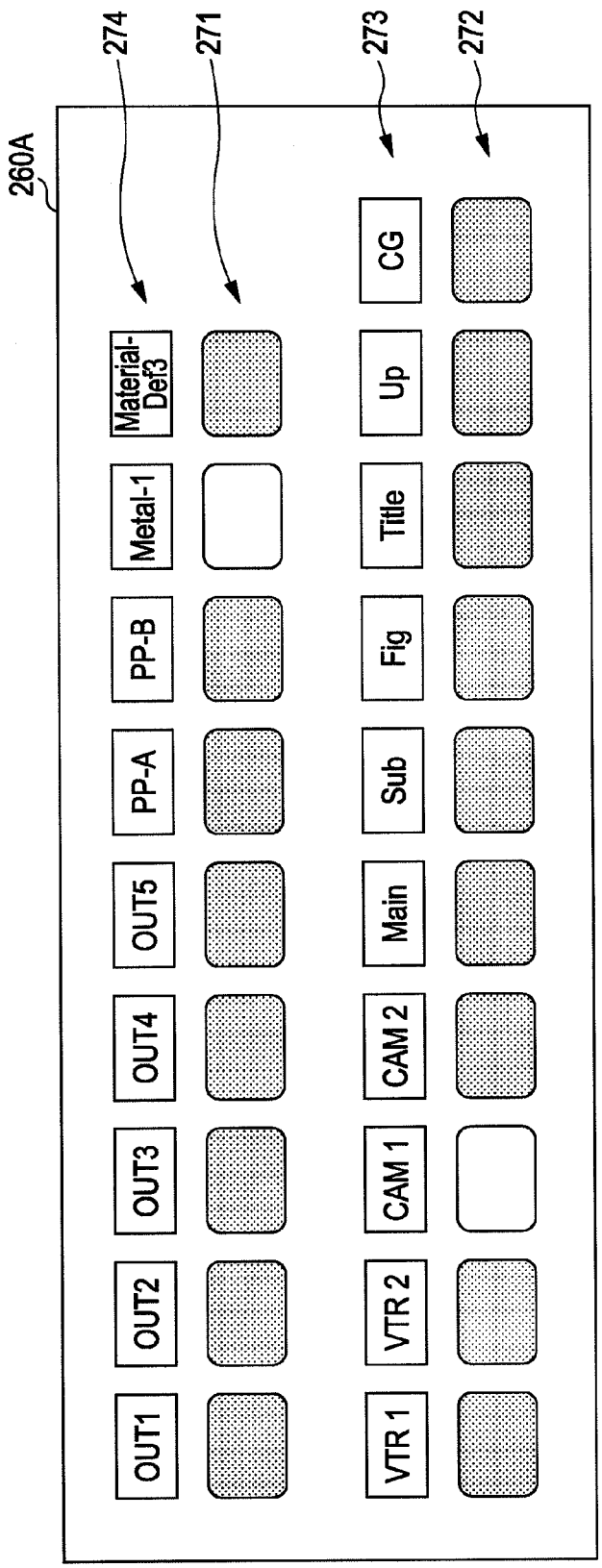
FIG. 20 is a diagram illustrating an external appearance of another example of a manipulation table.
Figure 23B:
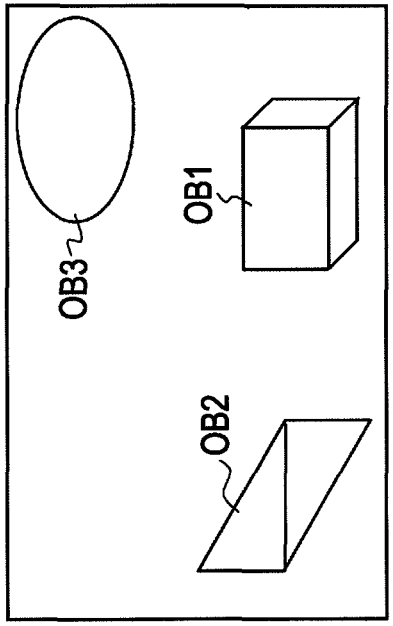
FIGS. 23A to 23D are diagrams illustrating examples of CG images in which three objects OB1 to OB3 are drawn and moved on a screen by their animations.
Figure 23D:
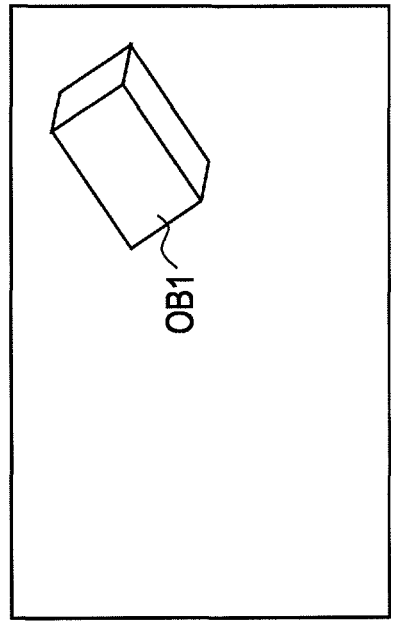
Figure 23A:
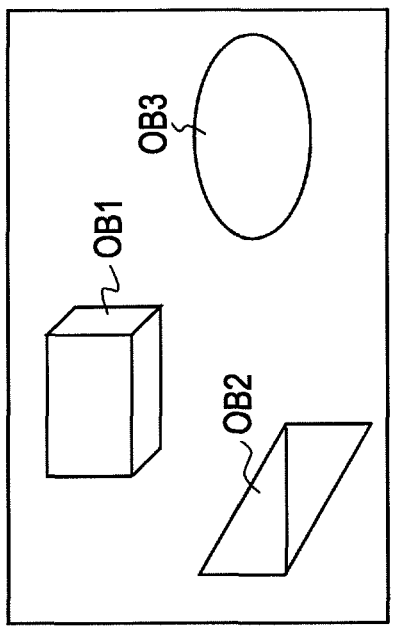
Figure 23C:
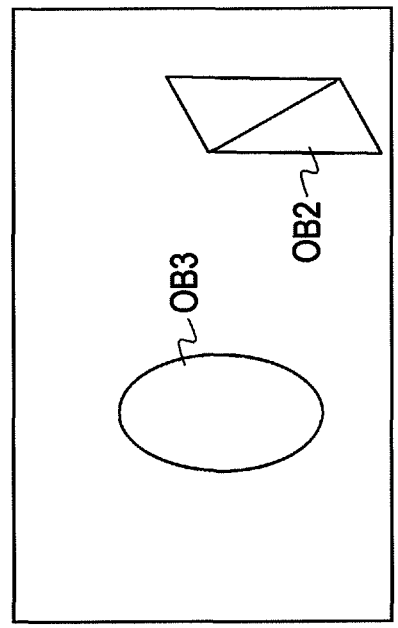
Figure 24A:
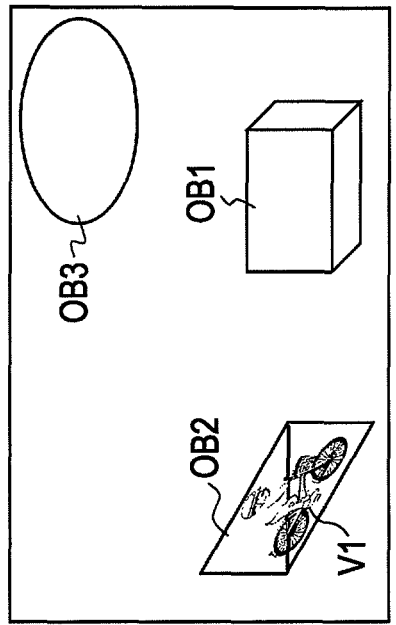
FIGS. 24A to 24D are diagrams illustrating examples of texture mapping of desired images onto the three objects OB1 to OB3 in certain timing.
Figure 24B:
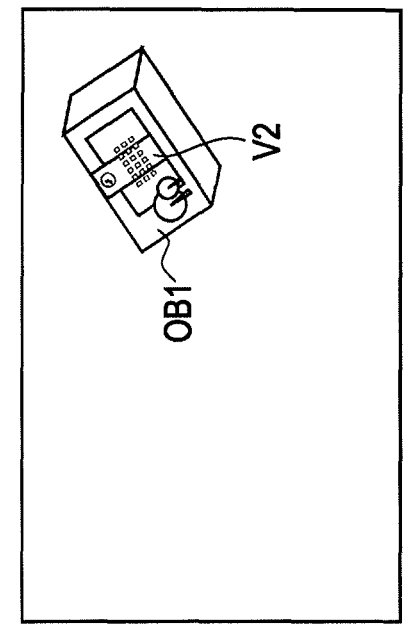
Figure 24C:
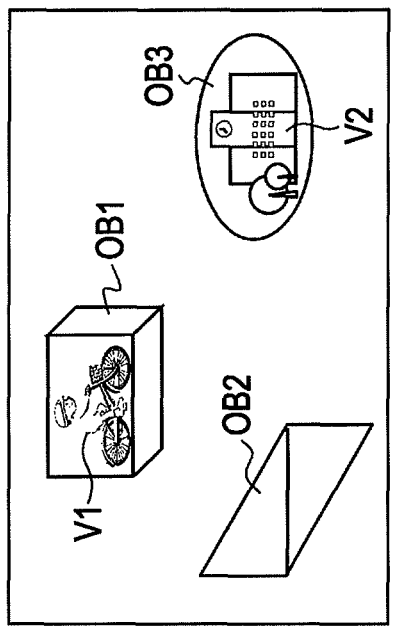
Figure 24D:
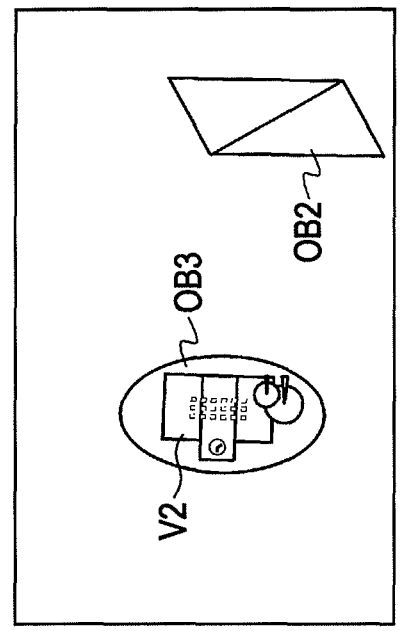

Instead of the manipulation table 260, as illustrated in FIG. 20, a manipulation table 260A may be used. In the manipulation table 260A, two press button lines 271 and 272, which extend in left and right directions, are installed in order in upward and downward directions. The press button line 272 is used to manipulate the on/off operation of the switches of the cross-point switch group of the matrix switch 160A. The press button line 272 is configured by alternative type press buttons that select connections of the output bus lines corresponding to the input lines, and the selected press button lights up.

On the manipulation table 260A, a character display portion 273 is installed corresponding to the press button line 272. The character display portion 273 displays characters for identifying the input images on the respective input lines. The character display portion 273 may be composed of, for example, a display device such as LCD (Liquid Crystal Display).

The press button line 271 is a designation button line, and is used to designate of which bus line the press button line 272 is used for the selection manipulation of the image data. The press button line 271 is configured by alternative type press buttons, and the selected press button lights up. On the manipulation table 260A, a character display portion 274 is installed corresponding to the press button line 271. The character display portion 274 displays characters for indicating of which bus line the press button line 271 is used for the selection manipulation of the image data. The character display portion 274 may be composed of, for example, a display device such as LCD.

It can be realized by GUI (Graphical User Interface) of which output bus line 271 the respective press button is used for the selection manipulation of the image data. FIG. 21 illustrates an example of GUI that is displayed during the assignment of the press button line (designation button line) 271. In this GUI display, nine press buttons of the press button line 271 are indicated as "1" to "9". A manipulator displays the selection of the output bus lines by manipulating a "Select button" corresponding to the lines "1" to "9", and selects a desired output bus line from the selection to assign a desired output bus line to the respective press button line.

FIG. 12B illustrates an example of GUI display that is displayed during selection of the output bust line. In this GUI display, the output bus lines 215 to 221 that constitute the output lines of the image data OUT1 to OUT7 for external outputs are displayed as selections on "OUT1" to "OUT7". Also, in this GUI display, the output bus lines 222 and 223 for inputting the image data to the program preview mixer 180 are displayed as the selection on "PP-A" and "PP-B".

Also, in the GUI display, a value (name) of a predetermined attribute is displayed as a selection in order to allocate press buttons to the output bus lines 211 to 214 that form the output lines of image data (mapping input) T1 to T4 for texture mapping. By a manipulator's manipulation, a certain attribute is set, for example, from the node (object), material definition, surface information on the material definition, and the like. Here, the manipulator sets attributes for performing the designation of the surfaces of the predetermined polygon that is the subject of texture mapping of the input image.

The image selection manipulation unit 170A extracts the value (name) of the set attribute from the CG description data generated from the CG production unit 110, and displays the extracted value as a selection on the GUI display. In the GUI display example of FIG. 12B, the material definition is set as attributes, and names of the material definitions are displayed as selections. "Metal-1", "Metal-2", "Material-Def1", "Material-Def2", and "Material-Def3" are the names of the material definitions.

In the GUI display example of FIG. 21, "OUT1" to "OUT5" are selected for "1" to "5". Also, "PP-A" and "PP-B" are selected for "6" and "7". Also, "Metal-1" and "Material-Def3" are selected for "8" and "9".

As described above, the matrix switch 160A has 13 output bus lines, and the respective output bus lines are specified by bus numbers "1" to "13". Also, as described above, the output bus line numbers 1 to 4 of the matrix switch 160A input the mapping inputs (image data) T1 to T4 to the image mapping unit 150A. The image selection manipulation unit 170A or a surrounding microprocessor has a mapping input correspondence table as illustrated in FIG. 13, in which line connections are stored. The mapping input correspondence table stores settings that correspond to the line connections, and would not be changed unless the line connections are changed.

If the value (name) of the predetermined attribute is selected with respect to a certain press button as shown as "8" or "9" in FIG. 21, the image selection manipulation unit 170A assigns the press button to an output bus line that has not yet been assigned among bus numbers 1 to 4. In this case, the output bus lines are output bus lines for outputting image data of images which are texture-mapped onto the surfaces of the polygon (polygon set) corresponding to the values (names) of the selected attributes. Also, the image selection manipulation unit 170A sends information on the values (names) of the selected attributes and information on which one of the mapping inputs T1 to T4 is the mapping input by the output bus line of the subject of assignment to the surface designation unit 120A through the network 130.

As illustrated in FIG. 21, it is exemplified that "Metal-1" is selected for "8" and then "Material-Def3" is selected for "9", and further explanation in this case will be made.

First, when "Metal-1" is selected for "8", the image selection manipulation unit 170A assigns the press button "8" to the output bus line 211. In this case, the output bus line 211 becomes an output bus line for outputting image data of an image which will be texture-mapped onto the surface of the polygon (polygon set) that corresponds to the material definition "Metal-1". Also, the image selection manipulation unit 170A sends the material definition "Metal-1" and information on the mapping input T1 to the surface designation unit 120A through the network 130.

Next, when "Material-Def3" is selected for "9", the image selection manipulation unit 170A assigns the press button "9" to the output bus line 212. In this case, the output bus line 212 becomes an output bus line for outputting image data of an image which will be texture-mapped onto the surface of the polygon (polygon set) that corresponds to the material definition "Material-Def3". Also, the image selection manipulation unit 170A sends the material definition "Material-Def3" and information on the mapping input T2 to the surface designation unit 120A through the network 130.

As described above, the image selection manipulation unit 170A, even in the case where the manipulation table 260A as illustrated in FIG. 20 is provided, can send the correspondence information between the selected attribute value (name) and the mapping input to the surface designation unit 120A, in the same manner as the case where the manipulation table 260 as illustrated in FIG. 11 is provided. Accordingly, the surface designation unit 120A can prepare an image assignment table that indicates the correspondence relation between the attribute value (name) and the mapping input and set the image assignment table in the image generation unit 140A.

In the case of the manipulation table 260A as illustrated in FIG. 20, for example, a manipulator can allocate the press button line 272 to the output bus line 211 corresponding to the material definition "Metal-1" by manipulating the press button "8" of the press button line 271. This output bus line is an output bus line for inputting the image data of the image, which is to be texture-mapped onto the surface of the polygon (polygon set) corresponding to the material definition "Metal-1", to the image mapping unit 150A. In this case, the manipulator can change the corresponding image data (mapping input) in certain timing by manipulating the press button line 272.

In this case, the manipulation table 260A as illustrated in FIG. 20 appears to have nine press buttons in the press button line (designation button line) 271. However, the number of press buttons for selecting the predetermined attribute values (names) is four at maximum. This is because the image processing apparatus 100A as illustrated in FIG. 10 has four output bus lines for supplying the mapping inputs (image data) to the image mapping unit 150A.

Also, as described above, it is exemplified that only one value (name) of the predetermined attribute is selected for press buttons "8" and "9" of the press button line (designation button line) 271. However, it is also considered to permit selection of a plurality of values (names) of the predetermined attributes with respect to a press buttons. In this case, an image according to output image data of the output bus line to which the press buttons have been assigned is texture-mapped onto surfaces of all polygons (polygon sets) corresponding to any one of the plurality of values (names) of the predetermined attributes. In this case, in the character display portion 274 (see FIG. 20) that corresponds to the respective press buttons, a plurality of values (names) of attributes is displayed. However, if it is difficult to display the plurality of attribute values (names), one or more values as many as possible are displayed.

Also, in the above-described second embodiment, the CG production unit 110, the surface designation unit 120A, the image generation unit 140A, and the image mapping unit 150A exist separately, and are connected together through the network 130. However, a configuration in which they are united may be considered.

FIG. 22 illustrates an image processing apparatus 100B that is obtained by modifying the image processing apparatus 100A as illustrated in FIG. 10. According to the image processing apparatus 100B, a CG production unit, a surface designation unit, an image generation unit, and an image mapping unit are configured into a personal computer 190. Although the detailed explanation has been omitted, other configurations and operations of the image processing apparatus 100B are the same as those of the image processing apparatus 100A as illustrated in FIG. 10.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a surface designation unit operable to automatically designate a surface of a polygon onto which an input image is to be texture mapped, wherein the surface is automatically designated based on a selection of a predetermined attribute associated with the surface,
   wherein the input image is texture mapped onto the surface for which a value of the predetermined attribute is in a range which includes a user selected value corresponding to the predetermined attribute; and
   an image mapping unit operable to texture-map the input image onto the surface of the polygon automatically designated by the surface designation unit based on the selection of the predetermined attribute.

2. The image processing apparatus according to claim 1, wherein
   the surface designation unit is operable to:
      automatically extract, from computer graphics description data, one or more values associated with the selected predetermined attribute; and
      responsive to the automatic extraction of the one or more values, automatically designate the surface of the polygon based on the automatically extracted one or more values associated with the selected predetermined attribute, and
   the image mapping unit performs texture mapping of the input image onto the surface of the polygon automatically designated by the surface designation unit in response to the automatic extraction of the one or more values.

3. The image processing apparatus according to claim 1, wherein the predetermined attribute comprises one or more of: material definitions, surface information of the material definitions, and/or image files corresponding to the material definitions.

4. The image processing apparatus according to claim 1, further comprising a plurality of image selection units, wherein the surface designation unit automatically designates the surface of the polygon for each of the plurality of image selection units, and the image mapping unit performs texture-mapping of the input image extracted by each of the plurality of image selection units onto the automatically designated surface of the polygon corresponding to each of the plurality of image selection units.

5. The image processing apparatus according to claim 4, wherein the surface designation unit sets an image assignment table for making correspondence between an image identifier that identifies the input image extracted by each of the plurality of image selection units and the automatically designated surface of the polygon corresponding to each of the plurality of image selection units, and the image mapping unit performs texture-mapping of the input image extracted by each of the plurality of image selection units onto the automatically designated surface of the polygon designated for each of the plurality of image selection units based on the image assignment table set by the surface designation unit.

6. The image processing apparatus according to claim 4, further comprising a display unit operable to display surface designation information corresponding to the plurality of image selection units, wherein the surface designation information indicates designated surface of the polygon corresponding to each of the plurality of image selection units.

7. An image processing method comprising:

in an image processing device:

selectively extracting an input image from a plurality of input image data;

generating a computer graphics image based on computer graphics description data;

automatically designating a surface of a polygon onto which the input image is to be texture mapped, wherein the surface is automatically designated based on a selection of a predetermined attribute associated with the surface, wherein the input image is texture mapped onto the surface for which a value of the predetermined attribute is in a range which includes a user selected value corresponding to the predetermined attribute; and texture-mapping the input image onto the surface of the polygon automatically designated based on the selection of the predetermined attribute.

8. An image processing apparatus comprising:

a plurality of image selection units, wherein each of the plurality of image selection units is operable to selectively extract an input image data from a plurality of input image data;

an image generation unit operable to generate a computer graphics image based on computer graphics description data;

a surface designation unit operable to automatically designate a surface of a polygon onto which the input image data is to be texture mapped, wherein the surface designation unit automatically designates the surface of the polygon for each of the plurality of image selection units, wherein the surface is automatically designated based on a selection of a predetermined attribute associated with the surface, wherein the input image is texture mapped onto the surface for which a value of the predetermined attribute is in a range which includes a user selected value corresponding to the predetermined attribute; and an image mapping unit operable to texture-map the input image data extracted by each of the plurality of image selection units onto the automatically designated surface of the polygon corresponding to each of the plurality of image selection units.

9. The image processing apparatus according to claim 8, wherein the surface designation unit is operable to:

automatically extract, from the computer graphics description data, one or more values associated with the selected predetermined attribute; and responsive to the automatic extraction of the one or more values, automatically designate the surface of the polygon based on the automatically extracted one or more values associated with the selected predetermined attribute, and the image mapping unit performs texture mapping of the input image data onto the surface of the polygon automatically designated by the surface designation unit in response to the automatic extraction of the one or more values.

10. The image processing apparatus according to claim 8, wherein the surface designation unit sets an image assignment table, wherein the image assignment table indicates correspondence between an image identifier that identifies the input image data extracted by each of the plurality of image selection units and the automatically designated surface of the polygon corresponding to each of the plurality of image selection units, and the image mapping unit performs texture-mapping of the input image data extracted by each of the plurality of image selection units onto the surface of the polygon automatically designated for each of the plurality of image selection units based on the image assignment table.

11. The image processing apparatus according to claim 8, further comprising a display unit operable to display surface designation information corresponding to the plurality of image selection units, wherein the surface designation information indicates the automatically designated surface of the polygon corresponding to each of the plurality of image selection units.

12. The image processing apparatus according to claim 8, wherein the computer graphics description data describes one or more of: definition of a material of a surface of a computer graphics object, definition of geometric information of the computer graphics object, and definition of a corresponding material.

13. The image processing apparatus according to claim 8, wherein the predetermined attribute comprises one or more of: material definitions, surface information of the material definitions, and/or image files corresponding to the material definitions.

14. The image processing apparatus according to claim 1, further comprising an image selection unit operable to selectively extract the input image from a plurality of input image data.

15. The image processing apparatus according to claim 1, further comprising an image generation unit operable to generate a computer graphics image based on computer graphics description data.

16. The image processing apparatus according to claim 1, further comprising an image generation unit operable to generate an image of an animation frame in real time.

17. The image processing method according to claim 7, further comprising:
- automatically extracting, from the computer graphics description data, one or more values associated with the selected predetermined attribute;
- responsive to automatic extraction of the one or more values, automatically designating the surface of the polygon based on the automatically extracted one or more values associated with the selected predetermined attribute; and
- texture mapping the input image onto the surface of the polygon automatically designated in response to the automatic extraction of the one or more values.

18. The image processing apparatus according to claim 8, wherein the computer graphics description data describes definition of geometric information corresponding to a position, direction, and size of a computer graphics object.

19. The image processing apparatus according to claim 8, wherein the computer graphics description data describes definition of animation.

20. The image processing apparatus according to claim 8, wherein the computer graphics description data describes definition of a camera.

* * * * *